United States Patent [19]

Fischer et al.

[11] Patent Number: 5,001,472

[45] Date of Patent: Mar. 19, 1991

[54] UNEVEN TOKEN DISTRIBUTION TECHNIQUE FOR TOKEN BASED LOCAL AREA NETWORK

[75] Inventors: Michael A. Fischer; William M. Cox; John L. Moschner, all of San Antonio; James H. Nuckols, Houston, all of Tex.

[73] Assignee: Datapoint Corporation, San Antonio, Tex.

[21] Appl. No.: 154,970

[22] Filed: Feb. 11, 1988

[51] Int. Cl.$^5$ .............................................. H04Q 9/00
[52] U.S. Cl. .............................. 340/825.5; 340/825.52; 340/825.08; 370/85.4; 370/85.6
[58] Field of Search ............ 340/825.5, 82.05, 825.07, 340/825.08, 825.51, 825.52; 370/85, 94, 86, 89, 85.4, 85.6, 85.8, 85.7

[56] References Cited

U.S. PATENT DOCUMENTS

| | | | |
|---|---|---|---|
| 4,373,183 | 2/1983 | Means et al. | 340/825.5 |
| 4,404,557 | 9/1983 | Grow | 340/825.05 |
| 4,454,508 | 6/1984 | Grow | 340/825.05 |
| 4,456,956 | 1/1984 | El-Gohary et al. | 364/200 |
| 4,459,588 | 7/1984 | Grow | 340/825.05 |
| 4,464,749 | 8/1984 | Ulug | 370/85 |
| 4,509,117 | 4/1985 | Korowitz | 364/200 |
| 4,536,874 | 8/1985 | Stoffel et al. | 370/85.4 |
| 4,538,147 | 8/1985 | Grow | 340/825.05 |
| 4,593,282 | 6/1986 | Acampora et al. | 340/825.5 |
| 4,609,920 | 9/1986 | Segarra | 340/825.51 |
| 4,663,748 | 5/1987 | Karbowiak et al. | 370/89 |
| 4,667,322 | 4/1987 | Ulug | 370/85.4 |
| 4,680,757 | 7/1987 | Murakami et al. | 370/89 |
| 4,701,908 | 10/1987 | Ikeda | 340/825.52 |
| 4,748,560 | 5/1988 | Kataoka | 370/85 |
| 4,779,092 | 10/1988 | Takao | 340/825.52 |
| 4,866,706 | 2/1989 | Christopherson et al. | 370/85.7 |

Primary Examiner—Donald J. Yusko
Assistant Examiner—Edwin C. Holloway, III
Attorney, Agent, or Firm—John R. Ley

[57] ABSTRACT

In a token-based local area network, the token may be selectively redirected out of its normal even rotational sequence among all of the active nodes of the network to pass the token more frequently through a priority group of nodes than through a non-priority group of nodes. The priority group is more likely to have messages to initiate from either a numerical or immediacy standpoint, compared to the non-priority group which is less likely to have messages to initiate. When token redirection is not desired, the token is passed in this normal even rotational sequence. Despite redirection, the token is still passed through all of the active nodes on the network in a periodic manner so as to assure normal network activity. Multiple messages can be initiated from a single node before the token is passed to any other node. Token redirection can be controlled in a predetermined pattern to accommodate either the actual or anticipated message traffic from the priority group of nodes, and can be controlled in response to a queue of messsages waiting to be initiated from a priority node.

24 Claims, 14 Drawing Sheets

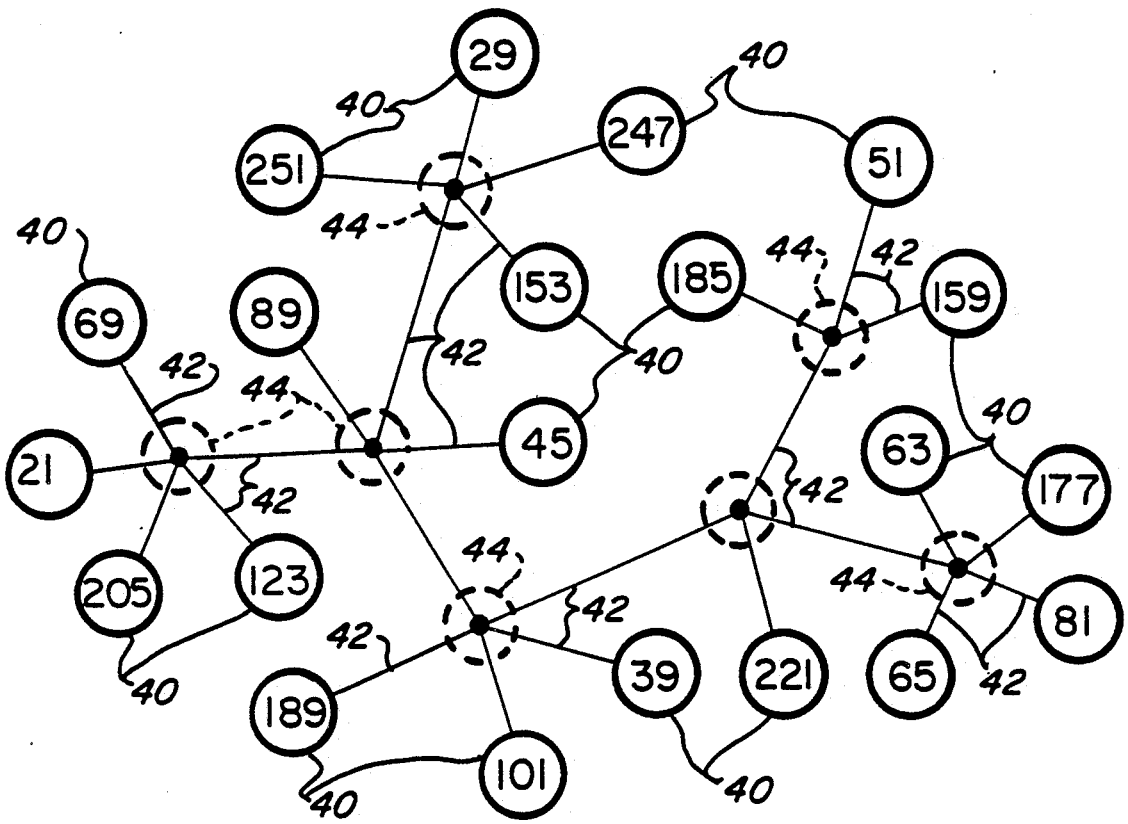
Fig_1
PRIOR ART
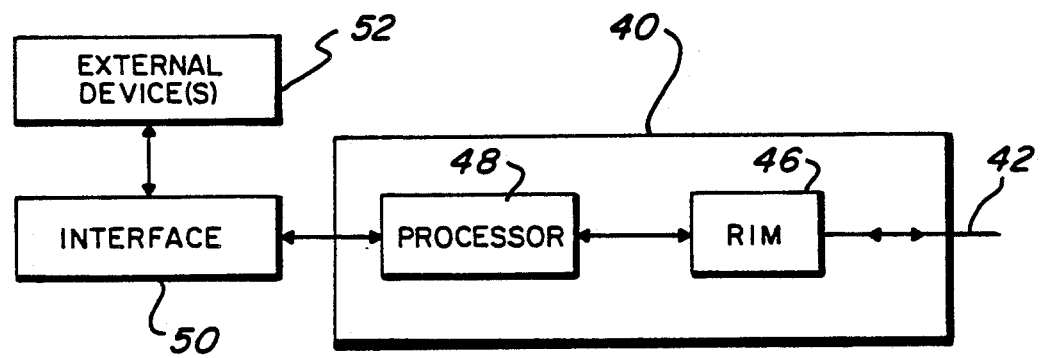
Fig_2
PRIOR ART

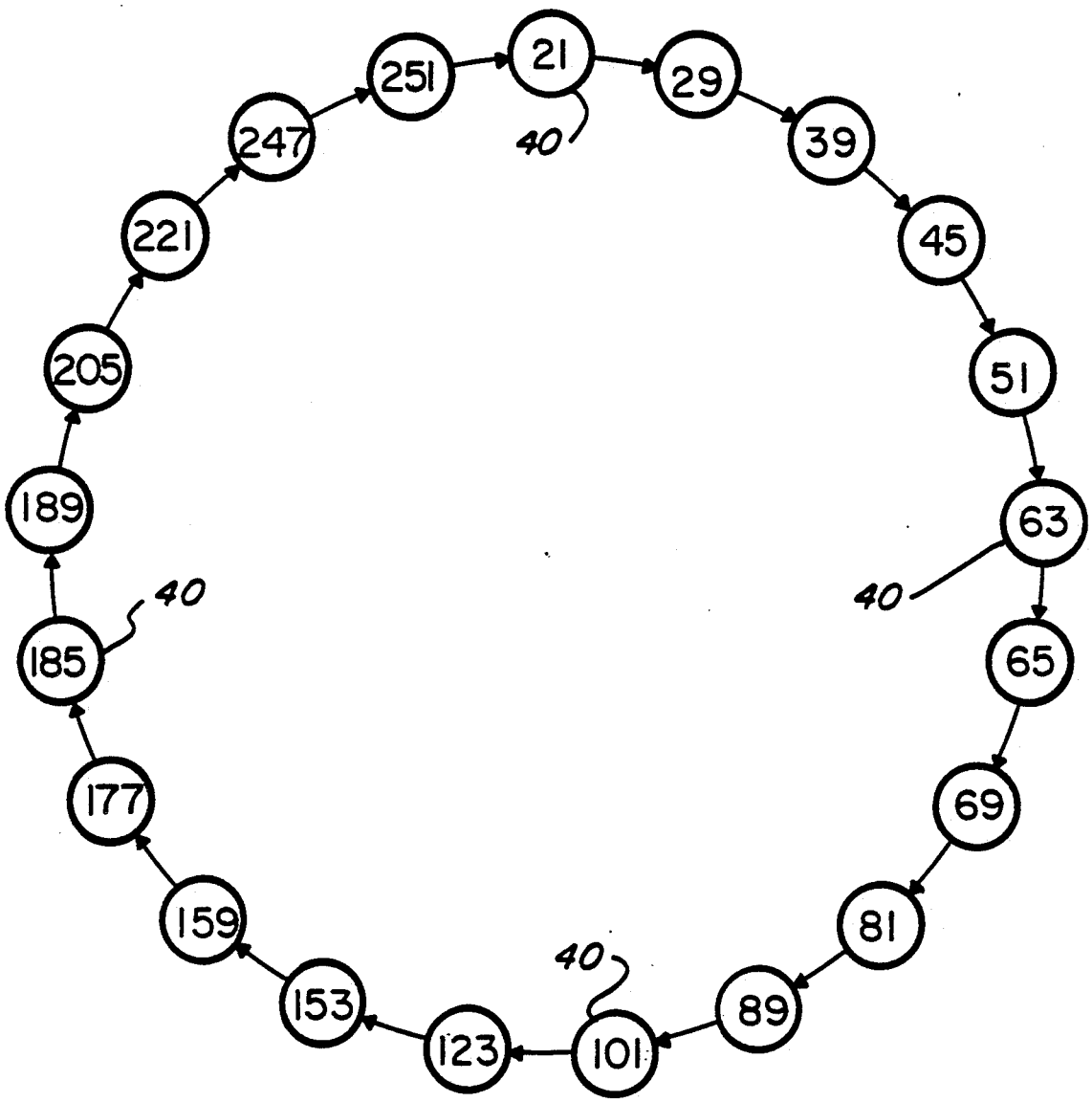
Fig_3
PRIOR ART
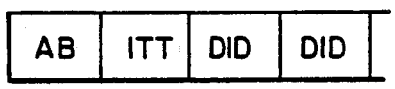
Fig_4A
PRIOR ART
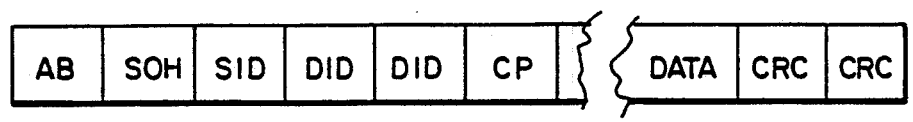
Fig_4B
PRIOR ART

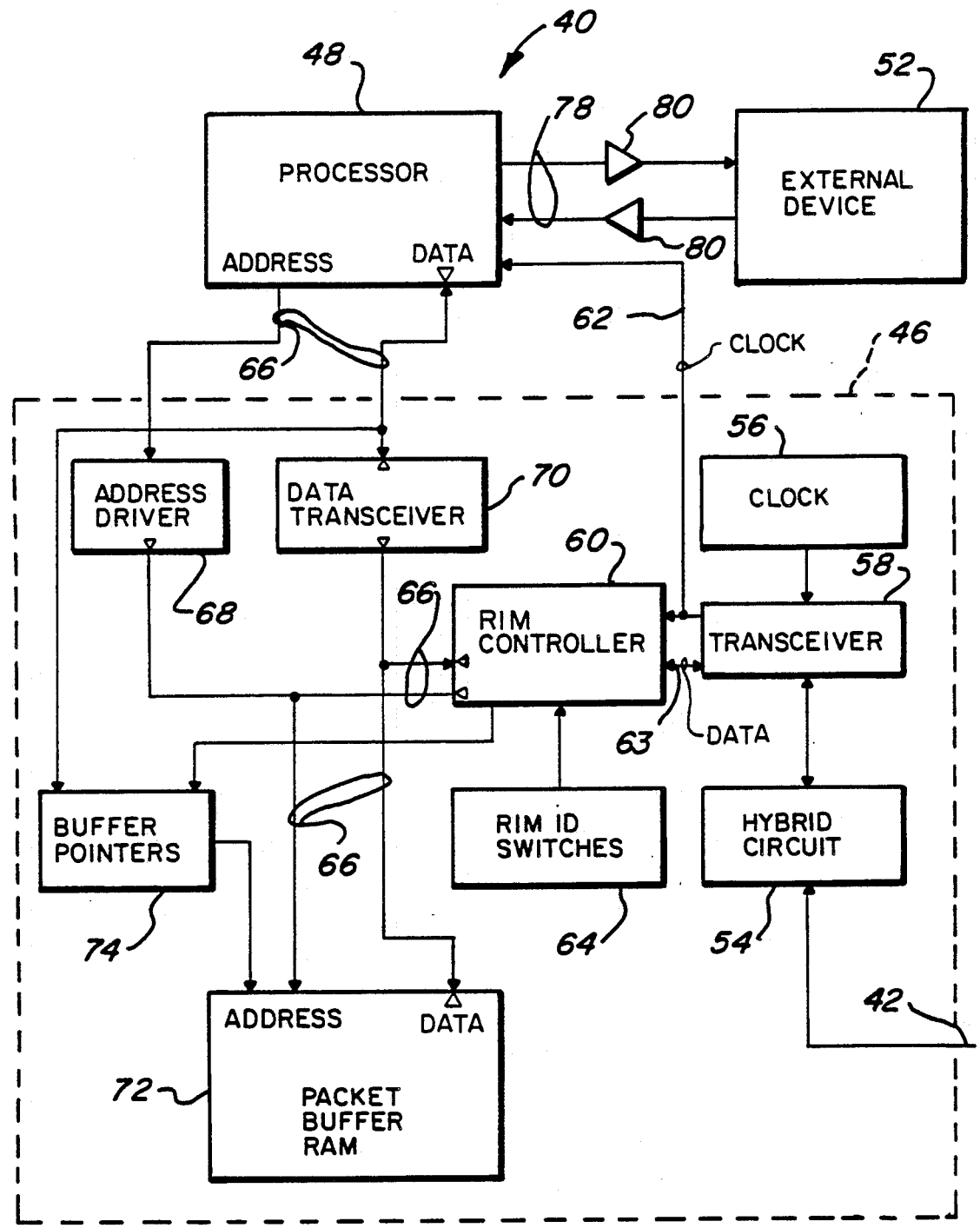
Fig_5
PRIOR ART

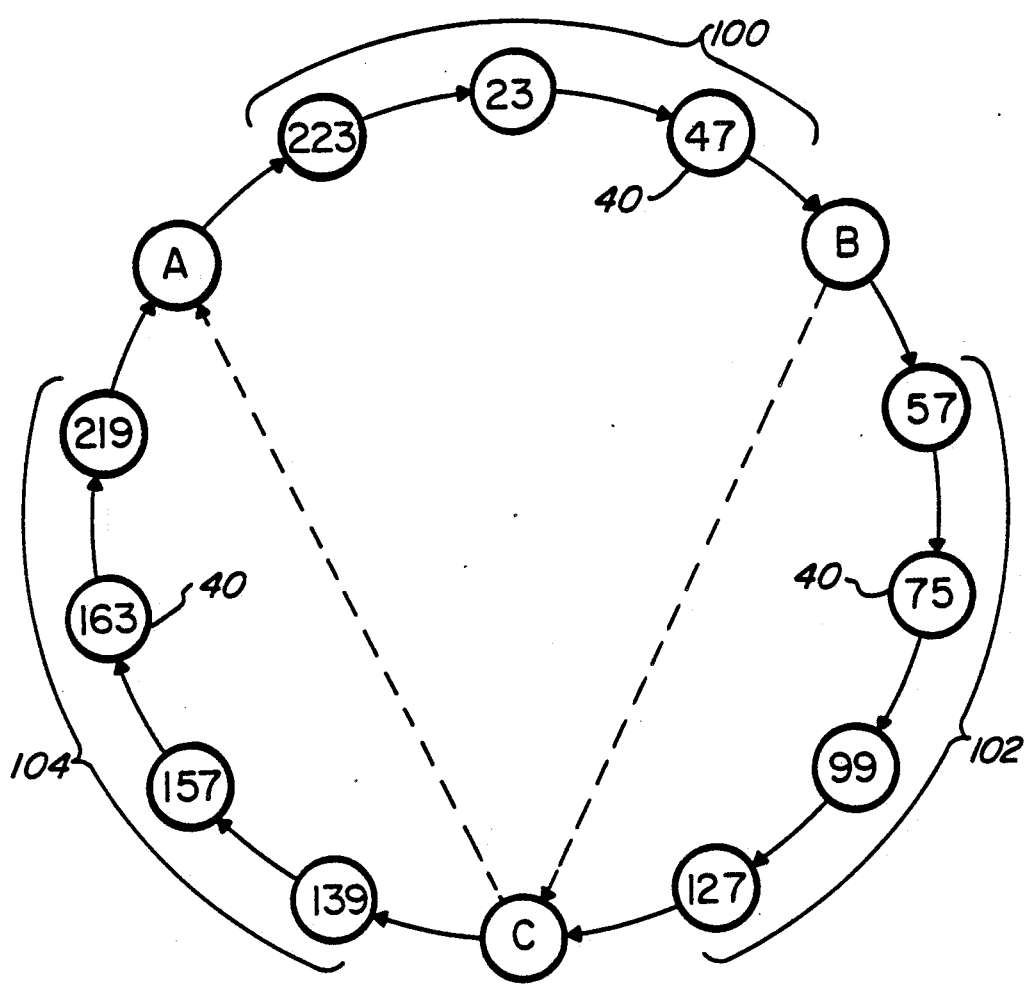
Fig_6
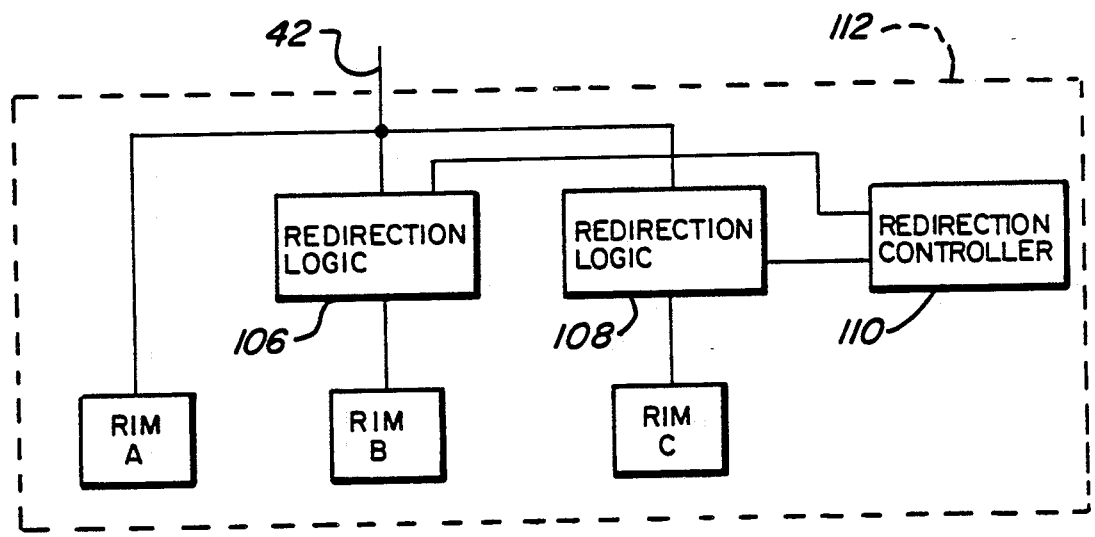
Fig_7

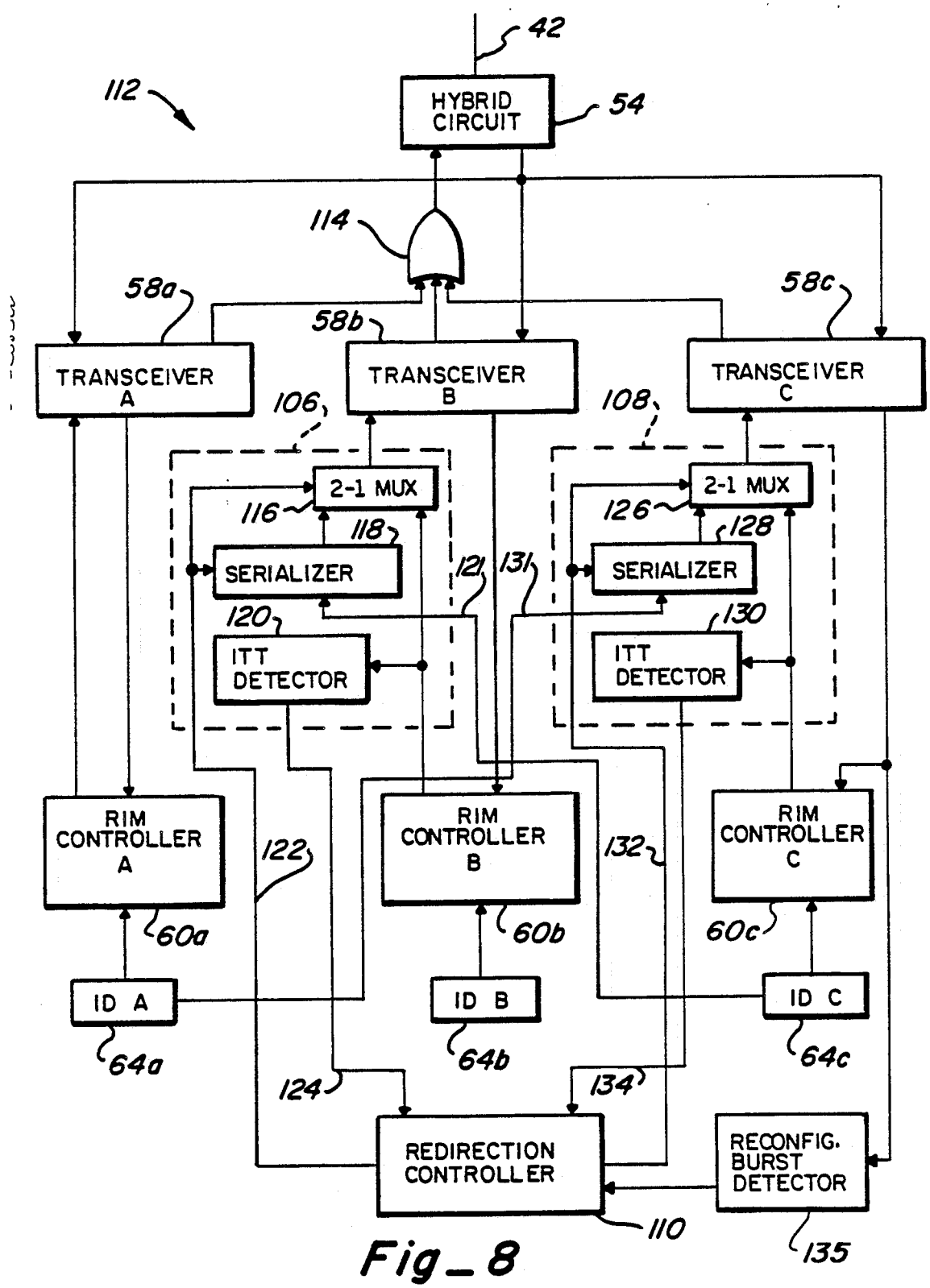
Fig_8

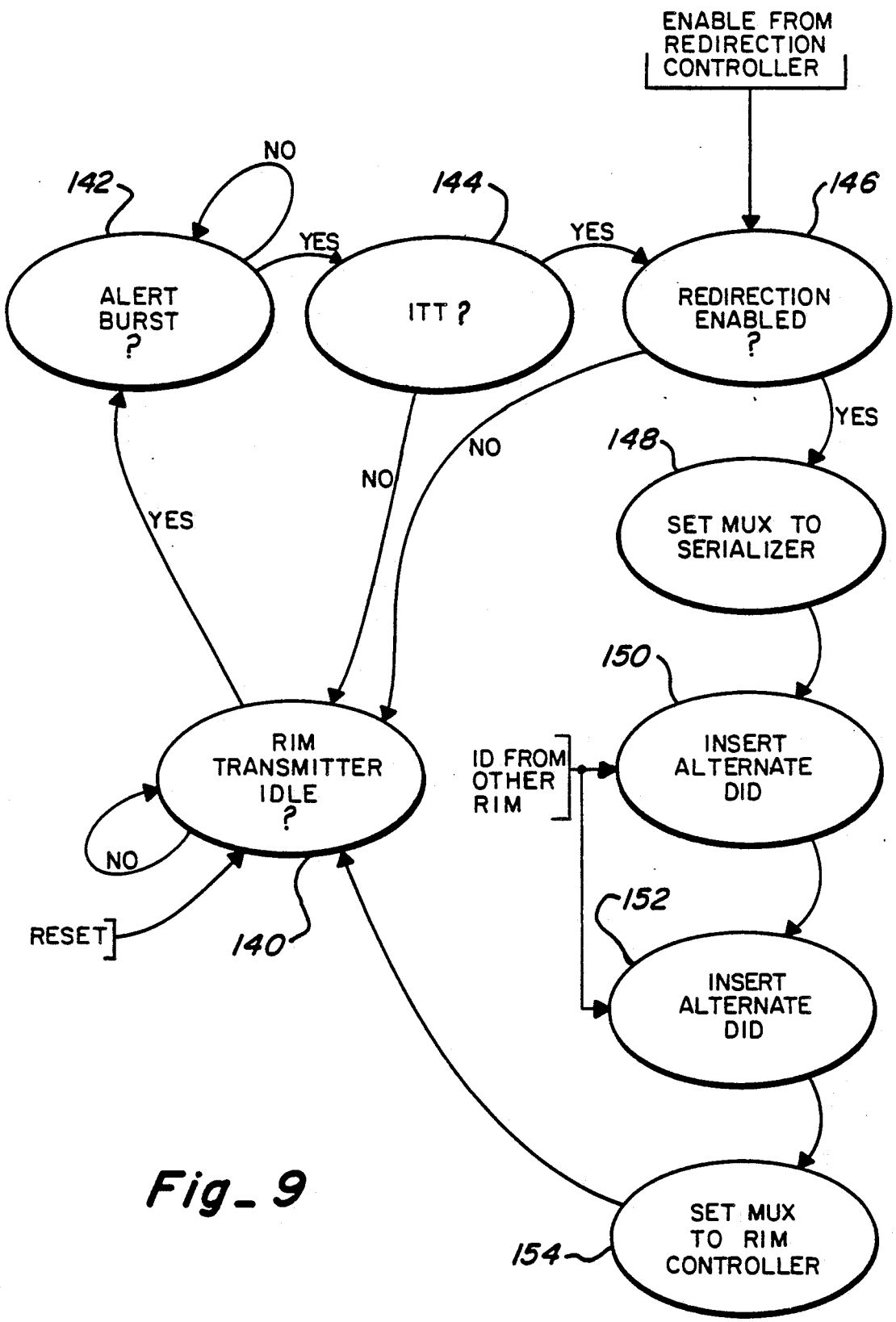
Fig_9

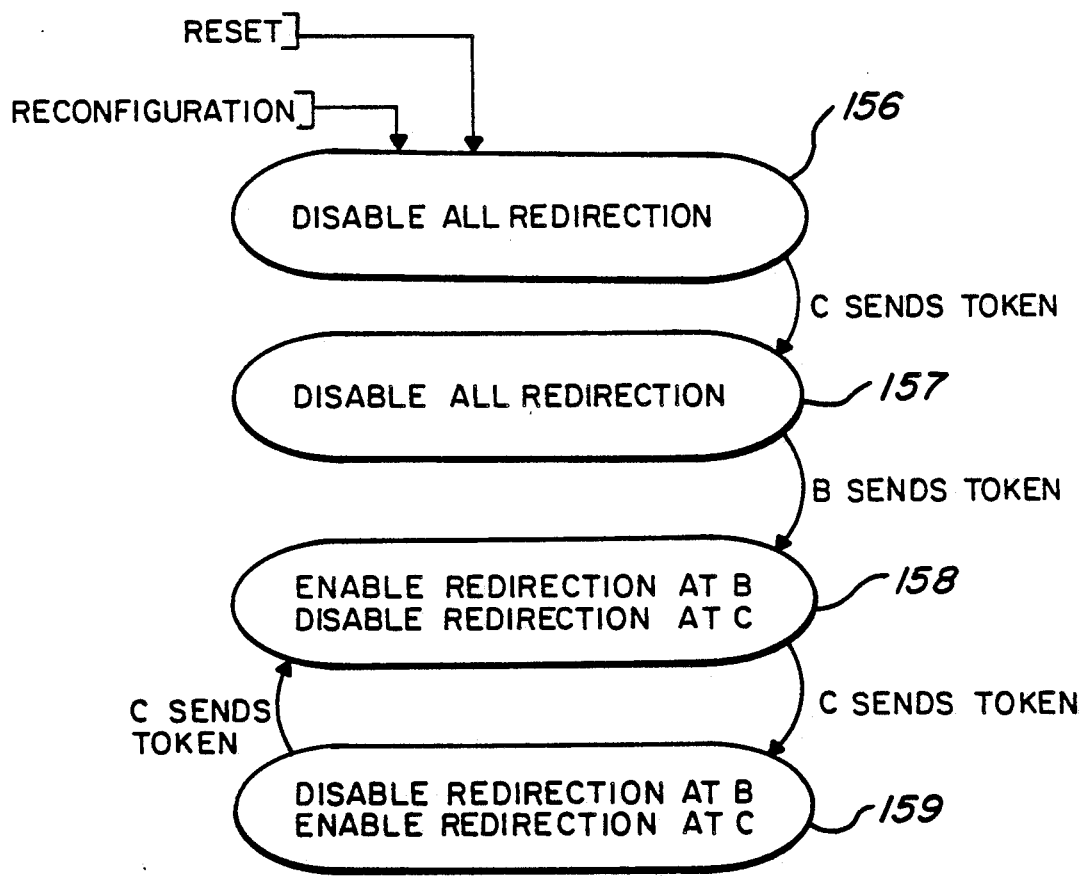
Fig_10

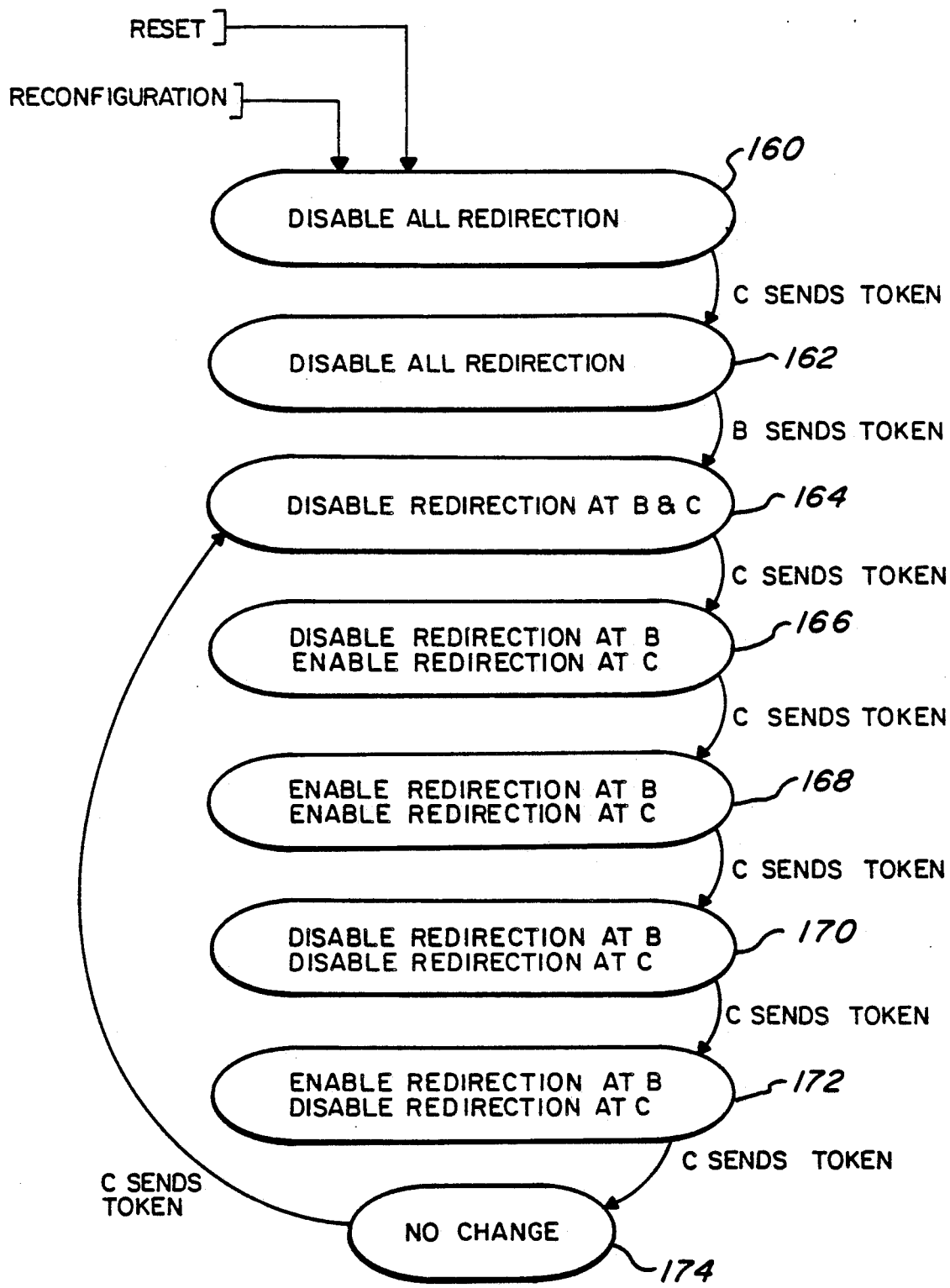
Fig_11

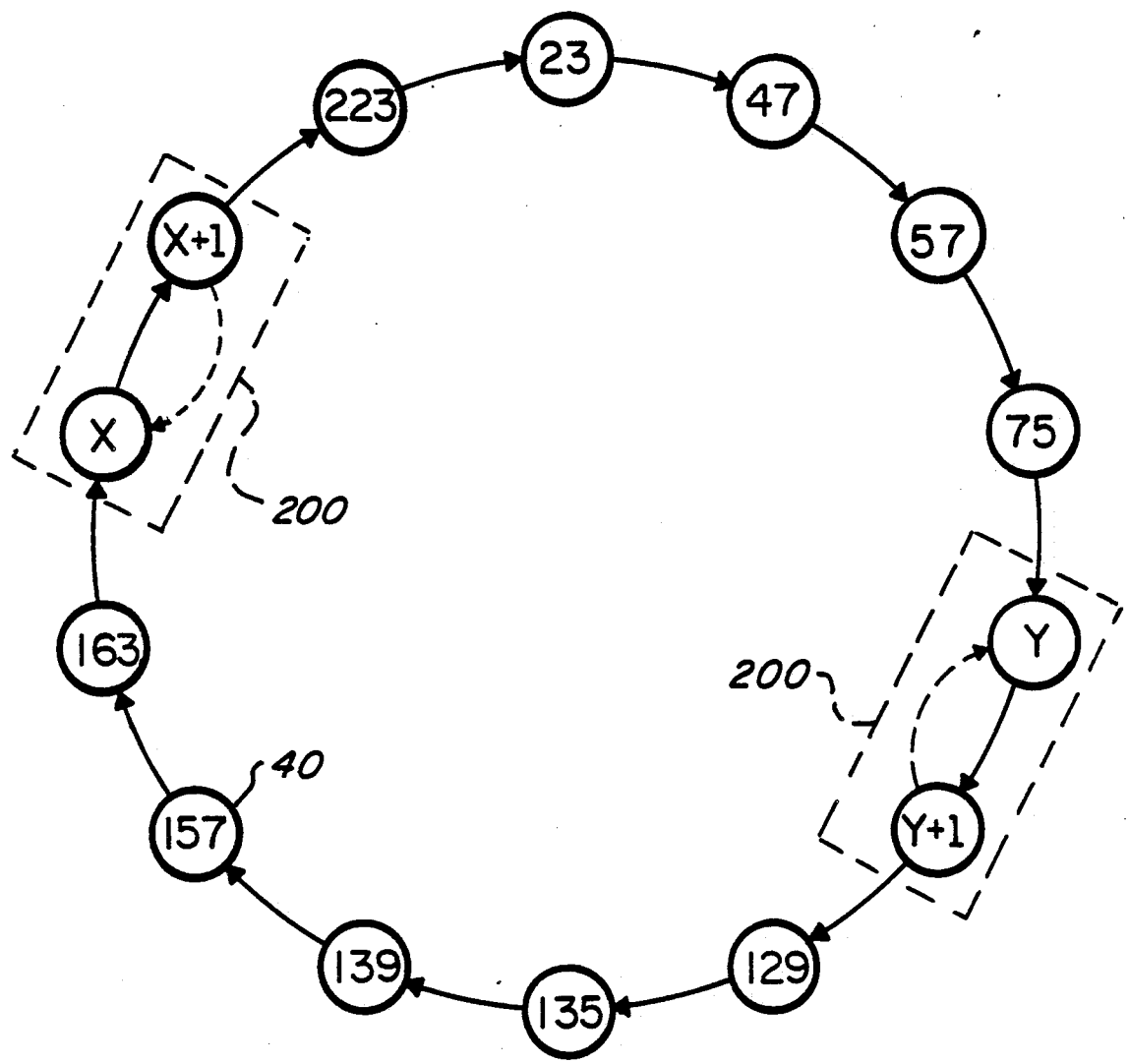
Fig_12
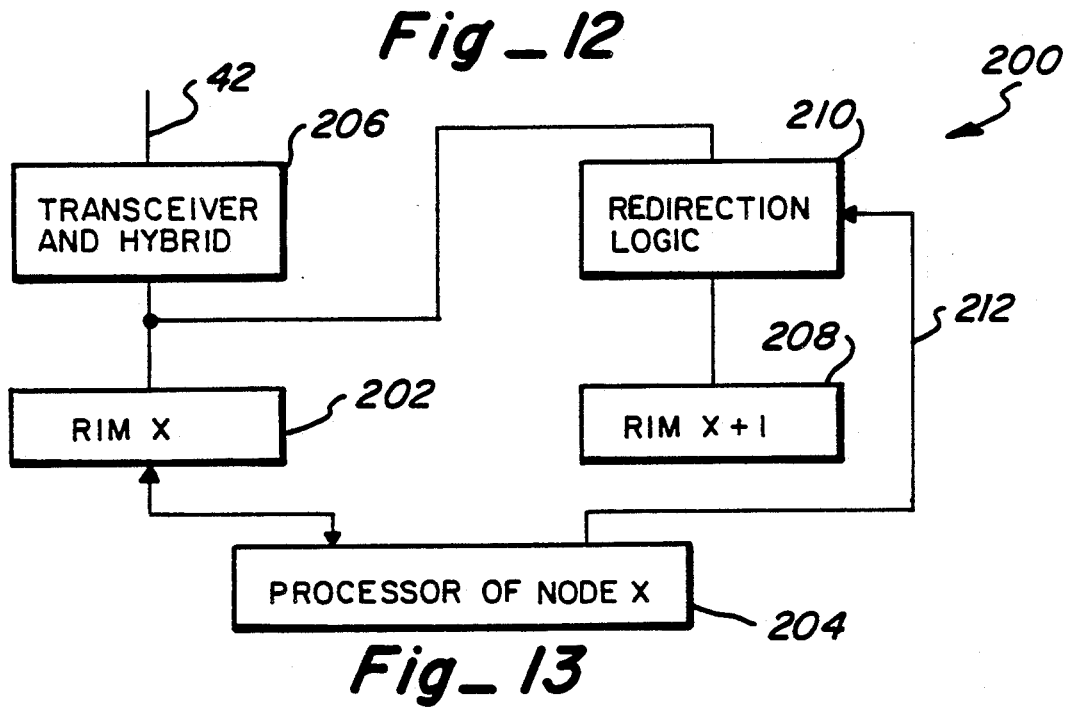
Fig_13

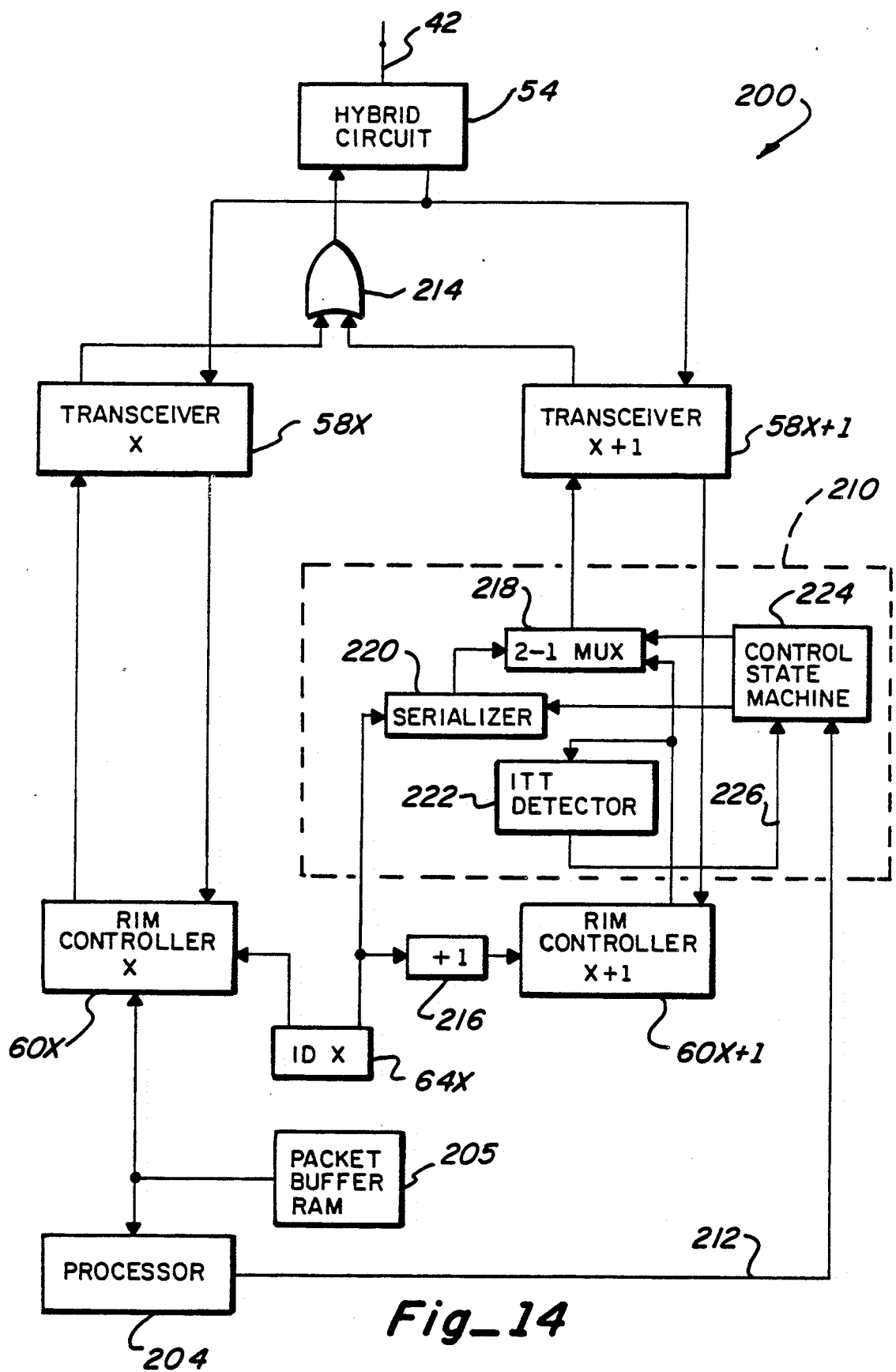
Fig_14

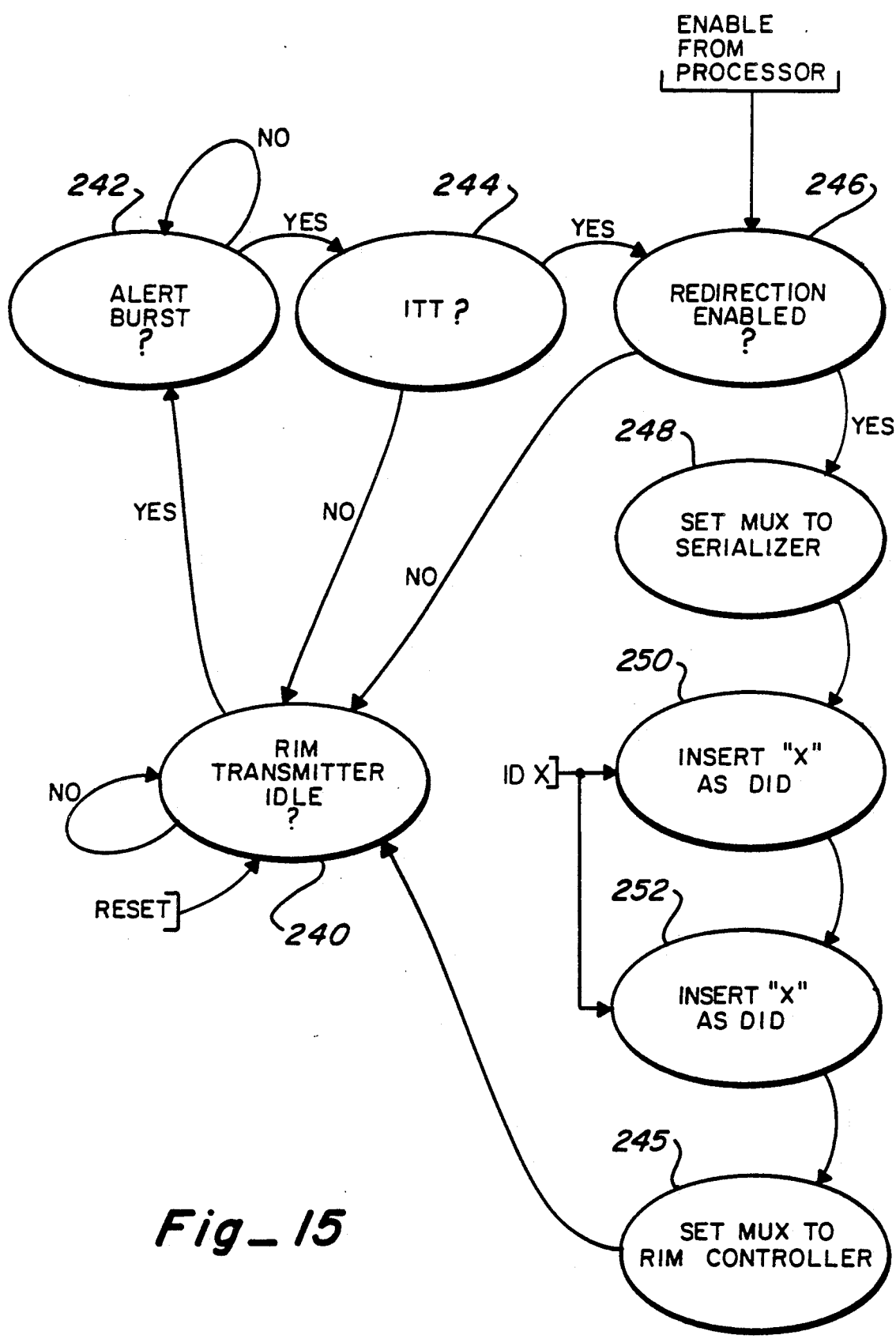
Fig_15

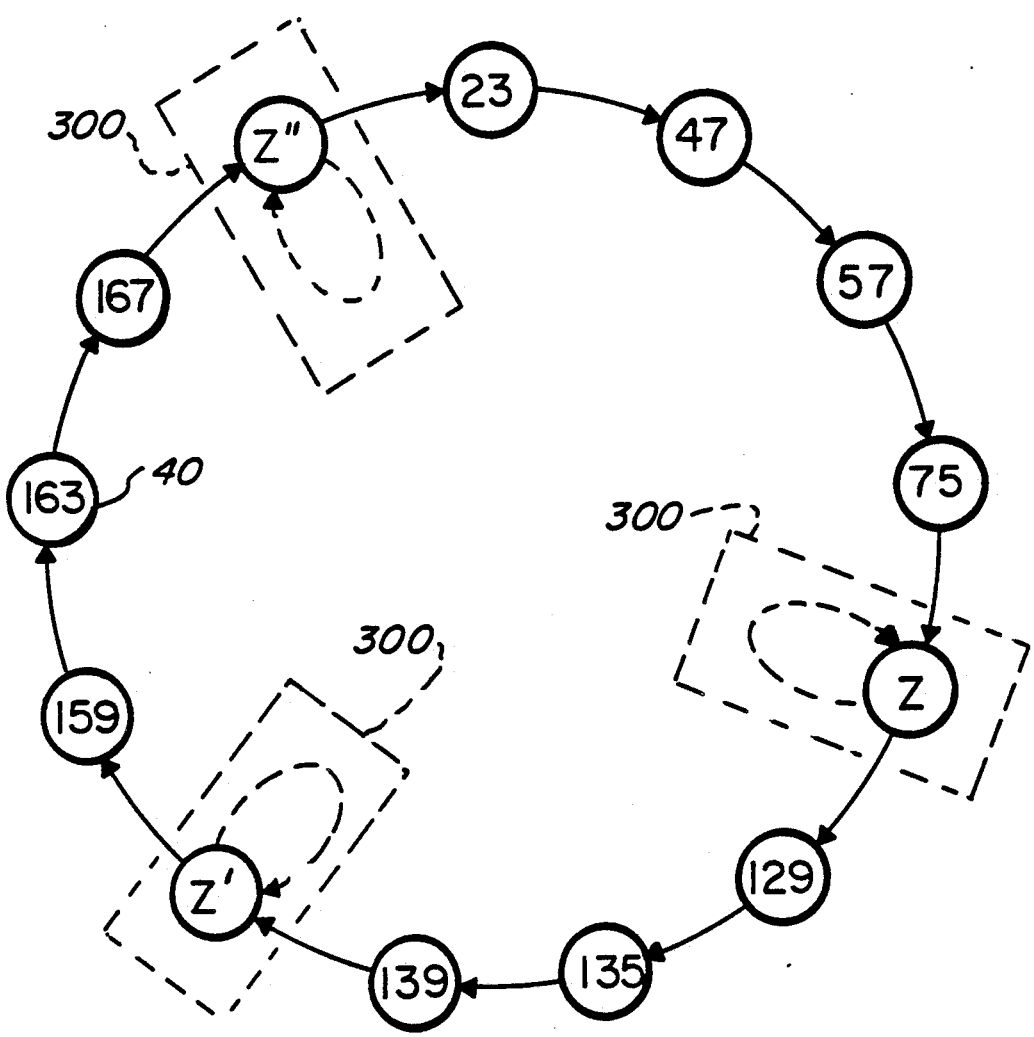
Fig_16
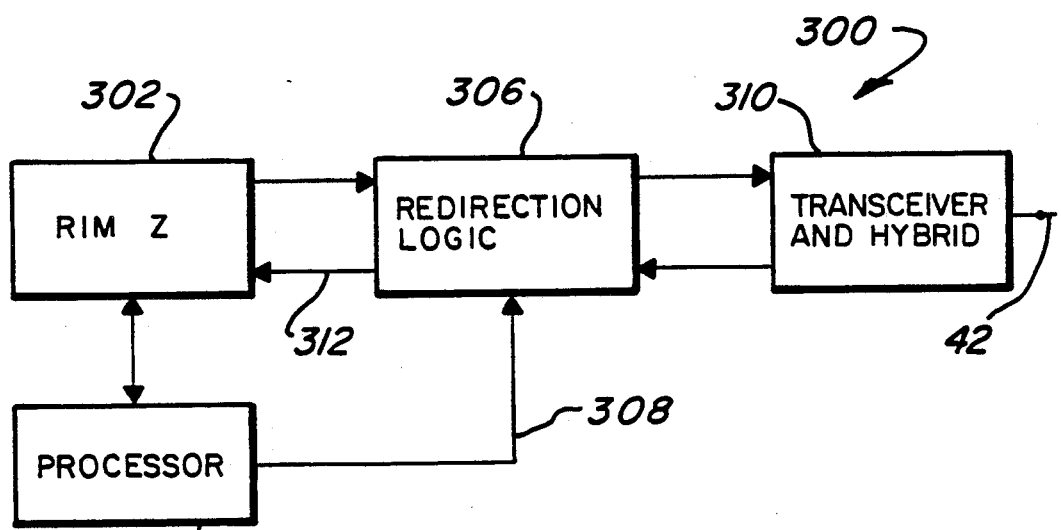
Fig_17

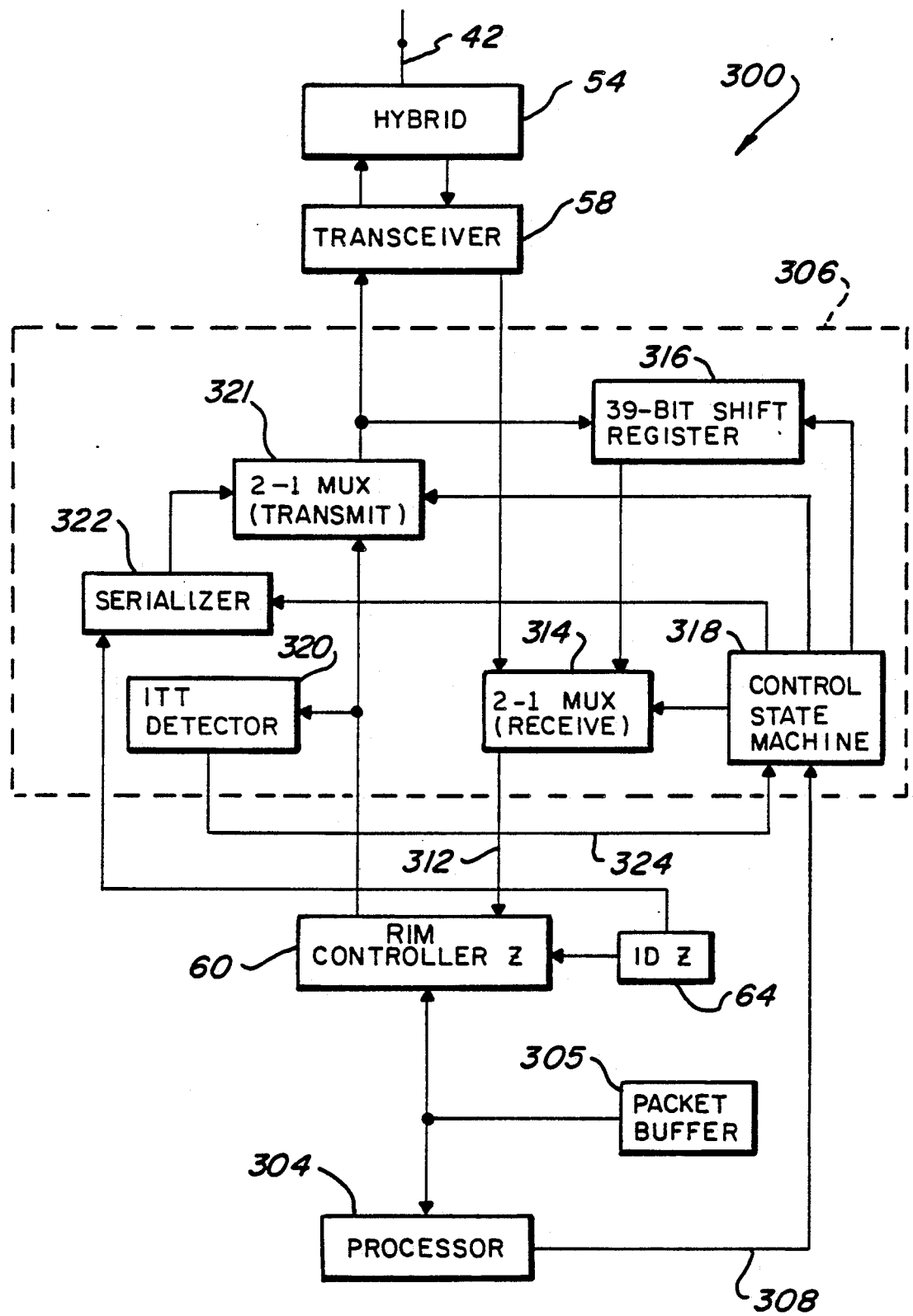
Fig_18

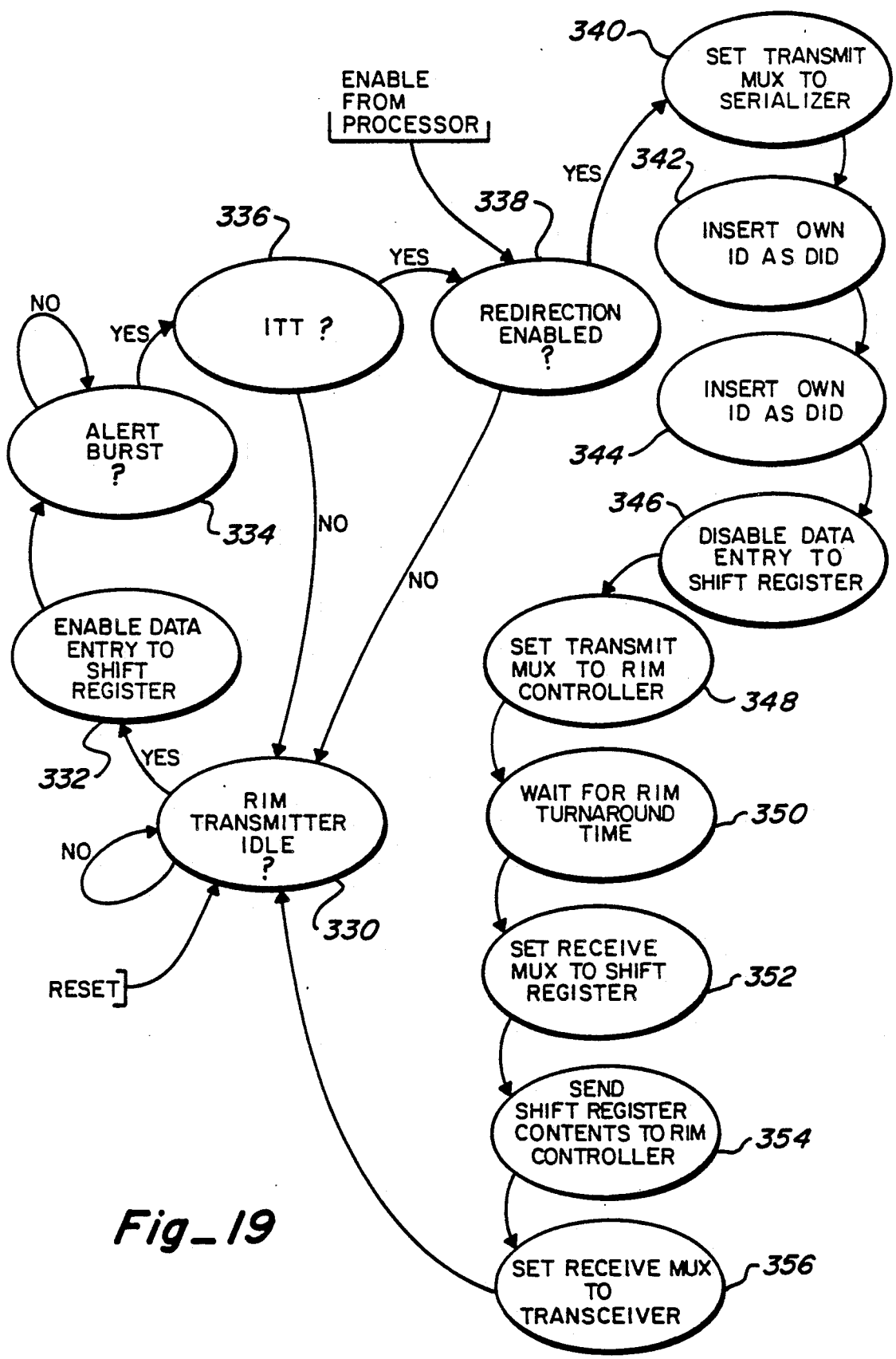
Fig_19

UNEVEN TOKEN DISTRIBUTION TECHNIQUE FOR TOKEN BASED LOCAL AREA NETWORK

This invention pertains to improvements in a token-based local area network (LAN). The improvements of the present invention are capable of unevenly or nonuniformally directing the token among the various active network nodes, to give preference to those nodes which are more likely to have more messages to communicate compared to those nodes which are less likely to have messages to communicate, or to give preference to those nodes which have a logically higher transmission priority. The relative proportion of network time spent communicating messages can be increased, while the relative proportion of network time devoted to passing the token among nodes which are less likely to have messages to communicate can be reduced.

BACKGROUND OF THE INVENTION

In general, a LAN is a communication medium and means by which a relatively large number of relatively closely physically located processor-based communications devices can send and receive message communications. As an example of a LAN, approximately 250 or less devices may be located within a single office building, adjacent office buildings or surrounding area of a few miles. The medium itself usually includes electrical or optical cables, but may also include radio or open-air optical links over which signals are conducted. Each device and its interconnection to the medium is referred to as a "node". Each node of the LAN has its own unique address. Messages are communicated between nodes by including address information within the transmissions associated with each message. Transmissions are disregarded by all nodes except those to which the transmissions are addressed.

All nodes can be simultaneously addressed by "broadcast" transmissions. Each node recognizes, and may respond to, a broadcast. This behavior is typical of all LANs and will not be further mentioned, it being recognized that the following descriptions relate to network operation and characteristics for all types of transmissions.

Access to the LAN is controlled to assure that only one message is properly communicated at a time, thereby preventing two or more nodes from simultaneously initiating transmissions which might interfere with one another and with the proper operation of the LAN.

One widely used technique of access control involves a "token". A token is the term applied to a signal or pattern of signals which is addressed to a specific node and which, upon receipt at the addressed node, causes that node to have the exclusive right to initiate a message communication over the medium. The operational protocol of the LAN permits only the node which last received the token to initiate the message communication. Since the LAN typically uses only one token, there is no interference by other message communications.

The operational protocol of the LAN also causes the token to be passed among all of the nodes in a regular, complete and even rotational pattern or sequence, thereby giving each node equal access to the medium for communication purposes. Each node receives the token in its turn, regardless of whether or not that node has a message to initiate. If the node has a message to initiate, it does so after receipt of the token, and then passes the token to the next node in the rotational sequence after the message communication has been completed. If the node does not have a message to initiate, the token is immediately passed to the next node in the rotational sequence.

The even rotational sequence of token passing has the advantage of assuring each node an opportunity to initiate a message without experiencing a delay greater than a fixed upper bound or time period. The disadvantage of the even rotational token passing sequence is that a considerable amount of network time might be wasted in passing the token to nodes which have no messages to initiate.

Another type of access control is contention arbitration or Carrier-Sense Multiple Access (predominantly CSMA/CD). With contention arbitration only those nodes which have messages to communicate vie for access to the LAN medium. When a node with a message to communicate detects that no other message communication is in progress over the medium, it initiates the message communication. So long as no other node also initiates a message simultaneously, the node which is first in time has exclusive access to the LAN medium for the duration of its message. If two or more nodes initiate message communications simultaneously, a collision of the transmitted signals occurs and prevents all transmissions from being correctly delivered. The collisions necessitate subsequent re-transmissions of all such attempted message communications. Thus, in contention arbitrated LANs, each node must contend with all other nodes for access to the LAN medium.

While contention arbitration techniques allow only those nodes which have messages to communicate to gain access to the medium, inefficiencies are created when a relatively large number of nodes have messages to communicate. Generally, among a large number of contending nodes, there will be a greater amount of contention, more waiting, more re-transmissions, and less useful communication. As message traffic increases, re-transmissions can consume a considerable amount of time. Some nodes may be inherently denied even or fair access to the medium, because they will repeatedly lose in the contention. There is no upper bound to possible waiting time on a heavily loaded contention arbitrated LAN. Contention-type LANs are not pertinent to the present invention, because the present invention pertains to token based LANs. Contention-type LANs do not utilize tokens.

LANs can further be distinguished by the signal connectivity or signal transmission patterns. Bus-type LANs connect all nodes to a single common logical or electrical point, although the single common point may be physically dispersed over a large location. Transmitted signals from any node are received about simultaneously by all the other nodes and are disregarded by all the receiving nodes except the node to which the transmission is addressed. Since all signals are transmitted and received through a common connection point, the communication path between all the nodes is bi-directional, usually half-duplex.

Ring-type LANs have all of their nodes physically connected in a serial loop or ring. Each node always transmits to its neighboring node on one side in the ring and receives from its neighboring node on the other side in the ring. All the nodes in the ring serially pass the transmissions from one to another in this manner. The address information contained within the transmission causes only that node addressed to receive and utilize the information. Thus, all transmissions in a ring-type LAN circulate in an unalterable predefined unidirectional signal path through all of the network nodes around the ring. When tokens are employed in a ring-type LAN, the tokens must also follow this unalterable ring-like physical path.

Some token ring networks allow the token to be physically directed to bypass portions of the ring. The diversion is accomplished by connecting the ring through concentrators in an arrangement known as a star-wired ring. The concentrators allow the token to be passed out of the normal rotational sequence, but the usual purpose of the concentrators is to improve reliability and maintainability of the network by eliminating problem nodes from the network or by maintaining continuous signal paths to the operational nodes of the network.

Bus-type LANs have the advantage of sending signals directly from the transmitting node to the receiving node, through the common connection point. Ring-type LANs must send the signals through every intervening connected node in the ring between the transmitting node and the receiving node, which could amount to a considerable physical distance. In bus-type LANs a quiescent time period after each message transmission must be provided to accommodate signal propagation and to allow the transmitted signal and its reflections to die out, before the next message transmission occurs. Accommodation for this quiescent time somewhat delays the speed by which the transmissions and the token can be sent and hence somewhat reduces the rapidity by which the bus-type LAN can pass the token and transmit signals. A quiescent time period is not required for ring-type LANs because all communication is unidirectional, point to point between adjoining neighboring nodes, and no accommodation need be made for signals elsewhere on the network so long as the integrity of the neighbor-to-neighbor node connectivity is maintained. Consequently, transmissions and token passing can occur relatively rapidly in ring-type LANs, because there is no need for a quiescent time period. However, the physical path of signal propagation is usually longer because the signal must follow the ring between the transmitting node and the receiving node, and because each intervening node introduces a slight time delay when receiving and re-transmitting the signal.

BRIEF SUMMARY OF THE INVENTION

In general terms, this invention relates to altering the normal rotational sequence of token passing among the nodes in a token-based LAN, in order to pass the token with greater frequency to certain "priority" nodes and to reduce the frequency of instances where the token is passed to "non-priority" nodes. Priority nodes include those which are more likely to have messages to initiate, such as file processors or file servers, and/or those whose transmissions are of relatively great urgency or importance, such as process monitoring and alarm equipment. Non-priority nodes are those which are relatively less likely to have messages to initiate. As a consequence of token redirection, less time is likely to be occupied in passing the token to the non-priority nodes or to nodes that have no messages to communicate. More messages are likely to be communicated in a given time, because more token passes to priority nodes will occur. Network performance is likely to be enhanced. Network performance or response can be very different under different traffic conditions, so it is difficult to make absolute statements regarding network performance. However, the major benefit of the present invention is believed to occur when there are a relatively large number of active nodes but only a relatively small number of them are priority nodes.

Altering the even or normal rotational sequence of token passing to pass the token to the priority nodes more frequently than to the other nodes is relatively conveniently accomplished on bus-type LANs, since any node can directly communicate with any other node through the common connection point. On ring-type LANs, token redirection may either be impossible because of the fixed point-to-point conductivity of the nodes, or be achieved only through the use of concentrators. Accordingly, the major applicability of the present invention is for token-based, bus-type LANs.

One embodiment of the present invention occupies three "special purpose" node addresses. The three special purpose addresses are located in the normal rotational pattern so that the first and second special purpose node addresses are at the beginning and the ending of a group of addresses normally associated with priority nodes. The third special purpose node address is located approximately midway in the rotational sequence of addresses of the other, non-priority nodes. Arranged in this manner, the three special purpose addresses divide the rotational sequence into three parts: a first part which includes primarily priority nodes, a second part which includes a portion, e.g. approximately half, of the nodes likely to be non-priority nodes, and a third portion, e.g. approximately the other half, of the nodes likely to be non-priority nodes. A selective token direction means causes the token to be selectively directed out of the normal rotational sequence when activated. The token can be selectively passed directly from the second special purpose address to the third special purpose address, thereby bypassing the portion of non-priority nodes between the second and third special purpose nodes. Similarly the token can be selectively passed directly from the third special purpose node to the first special purpose node, thereby bypassing the portion of the non-priority nodes between the third and first special purpose nodes. One of the two portions of the non-priority nodes is bypassed but the token is always passed through the priority nodes. The token can alternately bypass each of the two non-priority portions, and complete even rotational circulations of the token can be mixed with redirected passages of the token through the network. The token passing patterns can be controlled by a predetermined algorithm or algorithms.

The three special purpose address embodiment of the present invention can be readily adapted to existing networks. It requires no modifications of the conventional hardware, firmware or software existing at the nodes. The redirectional capability can be handled by a single piece of equipment containing all of the special purpose address devices, which is attached to the network. The three address embodiment consumes three network addresses, thereby reducing by three addresses the number of addresses available for use on either priority or non-priority nodes. It requires that all priority nodes be grouped with network addresses between the first and second special purpose addresses, thereby complicating the administrative process of selecting and assigning network addresses. Each LAN can utilize only one three address version of the present invention, because the inclusion of more than one such version in a single LAN might create overlapping redirectional patterns which prevent certain active nodes of the network from receiving the token, thus resulting in network disruption.

Another embodiment of the present invention is characterized as a one "special purpose" address version. The one address embodiment is incorporated in the interface circuitry of a conventional node connected to the communication medium. This interface circuitry accommodates two network addresses, one for the conventional node and another for the special purpose address which preferably follows the conventional node address in the even rotational sequence. The conventional node address is associated with a priority node, usually a file server node. A redirection logic circuit means utilizes the one special purpose network address and selectively controls the address to which the token is passed from the one special purpose address. After the first message is communicated from the priority node, the token is transmitted in the usual manner. If the processor associated with the priority node has more than one message to communicate, the redirection circuitry is enabled. The redirection circuitry transmits the token from the special purpose address immediately back to the priority node address so that the priority node can initiate another message. This back and forth token passing sequence continues so long as the priority node processor has messages to send and in accordance with other operational limitations to assure proper operation of the LAN. Once all of the messages have been communicated or other LAN operational limitations come into play, the token is passed from the one special purpose address on to the next sequential node in the even rotational sequence.

The one address version of the present invention can pass the token from the one special purpose address back to the priority node as often as the server processor at the priority node needs the token to accommodate the amount of outgoing messages to be communicated, commensurate with operational limitations imposed by the network protocol. The one address version can coexist with other such similar versions of the present invention on the same network, provided that other versions are not located between the priority node address and the one special purpose address. Each priority node can have its own one address version of the present invention. The one address version must be incorporated as an addition to the typical node interface circuitry. The one address version requires output transmission message queuing in the priority node processor to be maximally effective. It consumes one additional network address per priority node that cannot be used by other nodes.

A third embodiment of the present invention is characterized as a "zero" address version. The zero address version involves modifying the existing node interface circuitry to incorporate a redirection logic circuit means between the normal interface circuitry and a transceiver associated with each priority node. Message queuing may be used to determine whether the server processor with which the third version is associated has more than one message to communicate. When there is more than one message to communicate, the token transmitted by the interface circuitry is modified by the redirection logic means so that the address information transmitted onto the communication medium identifies the same node which is making the token transmission. The transmitted token causes the necessary network activity at the other nodes to signify normal network operation, but since the token is not passed to a different node, the same node can initiate the next sequential message communication. The same node is thus capable of initiating multiple message communications before the token is passed to a different node. When there are no further messages to be initiated or the LAN operational protocol requires the token to be passed, the redirection logic means is disabled and the token is passed unmodified to the next sequential address in the even rotational pattern.

The zero address version consumes no additional network addresses, hence giving rise to its "zero" address characterization.

All three versions of the present invention provide the priority nodes with more opportunities to communicate messages than the non-priority nodes. The three address version offers the improvement of reducing the latency or time between which the priority nodes receive the token. The three address version is particularly useful when the priority nodes include critical process monitoring nodes where it is important that information be communicated immediately. With the three address version, the latency between which subsequent tokens are received can be reduced to a significant fraction (e.g. $\frac{1}{2}$) of what the token receiving latency would otherwise be in network operation without the present invention. On the other hand, the one-and zero-address versions of the invention are particularly useful when the priority nodes are heavily loaded file servers. More opportunities are provided for these file servers to transmit messages, thus increasing the relative amount of useful data throughput while reducing the relative amount of token passing to nodes which have no messages to communicate. In such circumstances, use of the one-and zero-address versions may slightly increase token latency for certain nodes.

The scope of the present invention itself is more precisely defined by the appended claims. A more complete understanding of the invention and its embodiments can be gained from the following detailed description and from the accompanying drawings.

BRIEF DESCRIPTION OF THE DRAWINGS

FIG. 1 is a schematic illustration of a conventional prior art bus-type LAN.

FIG. 2 is a block diagram of a node of a prior art LAN such as that shown in FIG. 1.

FIG. 3 is an illustration of the normal even rotational sequence in which the token is passed between addresses of nodes in a prior art LAN such as that shown in FIG. 1.

FIGS. 4A and 4B are illustrations of prior art token and packet transmissions, respectively, which are transmitted and received by each node such as that shown in FIG. 2.

FIG. 5 is a block diagram of a prior art resource interface module (RIM) component included within the node shown in FIG. 2.

FIG. 6 is an illustration of the token passing sequences available from a first embodiment of the present invention referred to as a three special-purpose address version.

FIG. 7 is a block diagram of elements included within the LAN to achieve the token redirection functions of the first embodiment of the present invention illustrated in FIG. 6.

FIG. 8 is a block diagram illustrating in greater detail certain components shown in FIG. 7.

FIG. 9 is a state transition diagram illustrating the operation of the components shown in FIGS. 7 and 8.

FIGS. 10 and 11 are state transition diagrams illustrating examples of two different possible algorithms which might be employed in the components shown in FIGS. 7 and 8 to control token redirection.

FIG. 12 is an illustration of the token passing sequences available from a second embodiment of the present invention, referred to as a one special-purpose address version.

FIG. 13 is a block diagram of elements included within the LAN to achieve the token redirection functions of the second embodiment of the present invention illustrated in FIG. 12.

FIG. 14 is a block diagram illustrating in greater detail certain components shown in FIG. 13.

FIG. 15 is a state transition diagram illustrating the operation of the components shown in FIGS. 13 and 14.

FIG. 16 is an illustration of the token passing sequences available from a third embodiment of the present invention, referred to as a zero address version.

FIG. 17 is a block diagram of components included within the LAN to achieve the token redirection functions of the third embodiment of the present invention illustrated in FIG. 16.

FIG. 18 is a block diagram illustrating in greater detail certain components shown in FIG. 17.

FIG. 19 is a state transition diagram illustrating the operation of the components shown in FIGS. 17 and 18.

DETAILED DESCRIPTION OF PREFERRED EMBODIMENTS

Various embodiments of the present invention are described below with reference to a well-known local area network (LAN) known as ARCNET. ARCNET is a United States registered trademark of the assignee hereof. An extensive amount of material has been published on the ARCNET LAN, both by the assignee of the present invention and by others. Components to implement the ARCNET LAN are commercially available from sources including the assignee and others. One source of information concerning the ARCNET LAN is the "ARCNET Designer's Handbook" published by Datapoint Corporation, San Antonio, Tex., copyright 1983. Some of the following description pertaining to the LAN itself has been generalized and summarized. It should be understood that more detailed information is available from well-known sources.

A conventional bus-type LAN, such as ARCNET, is schematically illustrated in FIG. 1. The LAN comprises a plurality of nodes 40 (each represented by a circle) which are interconnected through a communication medium 42. The communication medium 42 includes means by which signals are transmitted between the nodes 40. The communication medium 42 may take the form of a plurality of interconnected signal communication links, such as coaxial cable, twisted cable pairs, optical links, radio links, or combinations of these and others.

The LAN illustrated in FIG. 1 is a bus-type LAN, meaning that all of the nodes 40 are connected to a single logical point and logically in parallel with one another. The nodes are connected through connecting point devices known as hubs 44. A hub 44 is a means by which a plurality of signal communication links can be connected to a single common logical point. By interconnecting a plurality of hubs 44, as is illustrated in FIG. 1, all of the nodes 40 are logically connected to a single point and in parallel in a bus-type configuration. The bus-type configuration of the LAN has the advantage that each node may directly address and communicate with another node. The communications need not pass through intervening nodes, which is the case with ring-type LANS.

As is shown in FIG. 2, each node 40 includes a resource interface module (RIM) 46, which is an interfacing and signal transmitting and receiving means connecting to the communication medium 42. A processor 48 is connected to the RIM 46 in each node 40. The RIM 46 and the processor 48 communicate with each other in sending and receiving message transmissions over the medium 42. Both the RIM 46 and the processor 48 are capable of controlling certain operations in each other. Messages are ultimately communicated between the processors 48 in each of the nodes 40 of the LAN, although the RIM 46 at each node controls the delivery and receipt of the message transmissions onto and from the communication medium 42.

Depending upon the type of node involved, a device interface 50 and one or more external devices 52 may be connected to the node. Examples of external devices 52 are keyboards, displays, printers, disk drives, tape drives, and the like.

One type of a priority node is a "server" node which primarily supplies information for the use by other nodes on the LAN. Server nodes will usually be file servers, and will typically include storage controllers as the components 50 and tape and disk drives as the components 52. One type of a non-priority node is a "client" node. A client node is primarily dependent on information received from server nodes for its functionality. Client nodes typically include keyboards and displays as components 52.

Each node 40 of the LAN has its own unique network address. The address is assigned to the node at the time the RIM 46 is physically connected to the LAN medium 42. The numbers inside the circles which designate the nodes 40 in FIGS. 1 and 3 are examples of network addresses.

Included within each RIM 46, is a token passing control means. A token is a predetermined electrical signal which, when received by the RIM of a particular node identified by its network address, enables that particular node to initiate a message communication. The token passing control means of the ARCNET LAN is of the distributed control variety, meaning that each RIM 46 includes its own components for identifying the network address of the next active node of the network and for passing the token to the next active node. This token passing functionality is distributed throughout all of the nodes of the network. Centralized token passing control techniques for LANs are also known. In centralized token passing control, a centralized node or processor controls the passage of the token from one active node to the other. The present invention has applicability to both distributed and centralized control arrangements for token passing in a LAN.

In addition to its own address, the address of the next active node in the even rotational token passing sequence is also identified in the RIM of each node. Inactive nodes, that is those which are not functioning at that time, are eliminated from the token passing rotational sequence, so only the active nodes participate in token passing. This avoids wasting time attempting to pass the token to inactive nodes. An inactive node is one which is not currently able to participate in network communication. An active node is one which is currently able to participate in network communication but which may or may not have messages to communicate.

Upon receipt of the token, the node initiates a message communication, if it has a message to communicate. At the conclusion of the message communication, or if no message is to be initiated, the RIM passes the token to the next active node in the rotational sequence. In this manner, the token is passed from node to node in an even rotational sequence among the active nodes as is illustrated in FIG. 3 after not more than one message communication has been concluded at each node.

The even rotational sequence of token passing is from a node of a lesser network address to the next active node of the next higher address. There is a maximum number of nodes in the network, for example 255 in an ARCNET LAN. When the token reaches the active node of highest address in the network, it is passed to the active node of lowest address to commence the next sequential rotation. In this manner, the token is normally passed in a circulating even rotational sequence as is illustrated in FIG. 3.

The token is one of five different types of transmissions incorporated in the message communication protocol of the ARCNET LAN. FIG. 4A schematically illustrates a token transmission, also known as an "invitation to transmit". The token and the other four types of transmissions commence with an alert burst (AB) followed by a number of framed eight-bit characters. An alert burst consists of six unit intervals of mark (signal). The eight-bit characters are each preceded by three framing bits consisting of two unit intervals of mark and one unit interval of space. The framing bits are not illustrated.

In the token illustrated in FIG. 4A, the first eight bit character following the alert burst is an invitation to transmission (ITT) character. The ITT character is followed by two repeated destination identification (DID) characters. Each DID character specifies the network address of the next active node in the rotational sequence to which the token is passed. The DID character is repeated to minimize the potential of disruption due to errors. As described herein, a node identification (ID) is synonymous with a network address. Upon the node at the destination address detecting the ITT character followed by its own address, the node at the destination address assumes control over the LAN medium for the purpose of initiating message communications.

Information is moved in packets between RIMs at the transmitting and receiving nodes. A packet transmission is illustrated in FIG. 4B. Each packet commences with an alert burst (AB) followed by a start of header (SOH) character, followed by a source identification (SID) character. The SID character specifies the address of the node which is sending the packet transmission. After the SID character, two repeated destination identification (DID) characters occur, followed by a Continuation Pointer (CP) character indicating the number of characters or bytes of data which next appear in a data field. After the data field, two cyclic redundancy check (CRC) characters appear.

Another ARCNET transmission not specifically illustrated is a free buffer inquiry (or enquiry). A free buffer inquiry is transmitted prior to transmitting a packet. The free buffer inquiry is sent by a source node wishing to initiate a message communication, to determine if the destination node has a buffer available to receive the packet of information.

The two other types of transmissions not specifically illustrated are an acknowledgement (ACK) and a negative acknowledgement (NAK). An acknowledgement is used as an affirmative response to the successful receipt of a packet and as an affirmative response to a free buffer inquiry. A negative acknowledgement is sent as a negative response to a free buffer inquiry. No response is delivered when a packet is not successfully received. The sending node interprets the failure to receive an acknowledgement after transmitting a packet as a failed transmission, and will try to send the packet again when it next receives the token.

A "message" as used herein may refer to more than one transmission. For example, a message which transmits data will consist of a free buffer inquiry transmission from the source node to the destination node, an acknowledgement transmission from the destination node to the source node, a packet transmission from the source node to the destination node, and an acknowledgement transmission from the destination node to the source node, in that order. All four transmissions define the message in this example, and all four transmissions occur while the source node holds the token. If the destination node has no buffers available in which to receive the packet, it transmits a negative acknowledgement back to the source node in response to the free buffer inquiry, and those two transmissions conclude the message. The token is then passed to the next node in the rotational sequence so that the next node may initiate a message communication.

The RIM at the destination node validates all incoming transmissions which are addressed to that particular node, by checking for the character representing one of the five previously described transmissions following the alert burst, at least one framing mark and exactly one framing space preceding each character, the proper CRC for packets, the proper number of characters in the packet, and at least nine spaces following the last character of each transmission.

The RIM determines, by a process known as system reconfiguration, the network address of the next sequential active node in the even rotational sequence. Inactive nodes do not participate in token passing, because the address of an inactive node is not included within the even rotational sequence of active nodes. During system reconfiguration, each node stores the next identification (NID) or network address of the next active node in the even rotational sequence.

In system reconfiguration, each RIM initializes its NID to its own ID. A timeout procedure based on RIM ID is used to select the RIM at the highest assigned ID, and that node commences by sending a token. After sending a token, the RIM at this highest address node waits for activity on the communication medium. If there is no activity for a predetermined time, that RIM increments its NID and repeats the process. As soon as the next active node responds to the token, the correct NID value is established. The RIM of the next active node commences repeating the same process until it successfully passes the token to the next active node in sequence of active nodes. The RIMs at all of the nodes function in a similar manner until the NID of each node is determined, which establishes the complete even rotational sequence of the network addresses of all active nodes.

System reconfiguration can occur at any time to allow new active nodes to enter the rotational sequence and previously active but now inactive nodes to drop out of the rotational sequence. When a RIM is first powered on and when it has not received a token for a predetermined time period, it sends a reconfiguration burst. The reconfiguration burst is eight intervals of mark followed by one interval of space repeated 765 times. The reconfiguration burst is longer than any other transmission, so it will interfere with the next token transmission and prevent the next RIM or any other RIM in the rotational sequence from receiving the token and assuming control of the medium. When the RIMs fail to sense activity on the medium for a predetermined time, system reconfiguration occurs. Thus when a new node becomes active it sends a reconfiguration burst to force system reconfiguration. When an active node becomes inactive and drops out of the rotational sequence, the attempted token pass to the inactive node will result in no RIM receiving the token. The node which attempted to pass the token will sense the inactivity, and after a predetermined timeout period, will commence the activity of incrementing its NID in an NID reconfiguration activity, as previously explained. When a previously active but now inactive node drops out of the rotational sequence, only the preceding active node will establish a new NID, and not all of the active nodes will establish the NIDs as in the case of a total system reconfiguration.

One of the important network protocol limitations necessary to achieve proper LAN operation with the present invention is that the token must not be redirected to such an extent that any node fails to receive the token within that predetermined time (typically, 840 ms) before a reconfiguration burst is delivered by that node, to cause a total system reconfiguration.

FIG. 5 illustrates a representative node 40 in greater detail than that shown in FIG. 3. The RIM 46 includes a hybrid circuit 54 which is electrically connected to the communication medium 42. The hybrid circuit 54 is a commercial product and is available for sale from Centralab, Inc., 2601 South Moorland Road, P.O. Box 2145, Milwaukee, Wis. 53201; or from Micro Technology, Inc., W141 N5984 Kaul Avenue, Menomonee Falls, Wis. 53051; or from Zenith CRT and Components Operations, 100 Milwaukee Avenue, Glenview, Ill. 60025; or from Standard Microsystems Corporation, 35 Marcus Boulevard, Hauppauge, N.Y. 11788. The hybrid circuit 54 includes a transformer coupling (not shown) and other circuitry for transmitting signals onto and receiving signals from the medium 42. A clock oscillator 56 supplies clock signals to a transceiver 58. In addition to controlling the timing of the RIM 46 components, the clock 56 also establishes synchronization with respect to the data bits appearing on the medium 42. The transceiver 58 contains a transmitter which supplies signals to, and a receiver which receives signals from, the hybrid circuit 54. The transceiver 58 also supplies clock signals over a conductor 62 to a network controller 60 and, in many embodiments, to the processor 48. The transceiver 58 is a commercially available item from Standard Microsystems Corporation under the designation COM 9032 and NCR Corporation under the designation 90C32.

The network controller 60 is the major functional component of the RIM 46. Connected to the controller 60 are a series of switches 64 by which to establish the unique RIM identification number (RIM ID) or network address. The controller 60 contains a microprogrammed sequencer and all of the logic necessary to control token passing and to send and receive data packets at the appropriate time. The controller 60 also automatically participates in reconfiguration of the network as nodes become active or inactive. The controller 60 also performs address decoding functions, cyclic redundancy checking (CRC) during packet transmission and reception, and packet acknowledgement as well as other network functions. In short, the controller performs all the necessary functions to secure functionality according to the network protocol. The controller 60 is a commercially available item from Standard Microsystems Corporation under the designation COM 9026 and from NCR Corporation under the designation 90C26.

A conventional multiplexed address/data bus 66 extends from the controller 60, and is the means by which data and address communication is accomplished. A uni-directional address driver 68 and a bi-directional data transceiver 70 may also be connected to the bus 66 for the purpose of allowing the processor 48 to access this bus 66.

A packet buffer random access memory (RAM) 72 is also connected to the bus 66. The RAM 72 includes enough 8-bit storage locations to hold the transmitted and received packets, typically four packets. The RAM 72 may be accessed by both the controller 60 and the processor 48 over the bus 66. A buffer pointer 74 is an optional item, but when present, is used for identifying which of the packet storage areas in the RAM 72 are to be used for holding packets to be transmitted, for storing packets which may be received, and for holding packets which have been received and are awaiting processing by the processor 48. In those embodiments where the buffer pointer 74 is omitted, the entire RAM 72 address is supplied by the controller 60 and the processor 48. The controller 60 supplies all the signals necessary to allow arbitration of access to the RAM 72 between itself and the processor 48.

The processor 48 may include a variety of I/O ports 78 and associated line drivers and receivers 80 to interface with the external device 52, as an example. The processor 48 functions in the conventional manner. Software or firmware programs running on the processor 48 accomplish data processing, data storage and data communication functions with both the external devices 52 and other nodes on the LAN through the RIM 46. Control sequences are communicated by the processor 48 to the controller 60, via the address and data bus 66. The data interchange takes place primarily through information stored in the packet buffer RAM 72.

Network transmissions are initiated by the processor 48. Packets to be transmitted are formatted and placed into the packet buffer RAM 72. The processor 48, under the control of its programs, instructs the controller to perform a network transmission. The controller 60 thereafter accomplishes the transmission in accordance with the network protocol described previously.

Packets addressed to and received by the node identified by the switches 64 in the RIM 46 are detected by the controller 60 and placed into the packet buffer RAM 72. The controller 60 then signals the processor 48 that information is present in the packet buffer RAM 72 and that information is available to be interrogated by the processor 48. The processor thereafter obtains the information from the packet RAM 72 over the address and data bus 66.

The capability of a first embodiment of the present invention to selectively redirect the token out of the normal even rotational sequence, or for normally passing the token to the next active node in the usual rotational sequence is illustrated by FIG. 6. Each active node in the network is represented by a circle. The normal even token passing sequence is illustrated by solid arrows between nodes, the same as that illustrated in FIG. 3. The redirectional capability of the token passing sequence is illustrated by dashed arrows in FIG. 6. The numbers within the circles represent the addresses or identifications of the nodes. Three RIM-like devices A, B and C, are included within the usual rotational sequence. The RIM devices A, B and C are not nodes because they do not include a processor and because they never initiate or receive messages. The RIM devices A, B and C do have assigned to them "special purpose" network addresses. The special purpose addresses are located in the even rotational sequence illustrated by the solid arrows. The special purpose address of each of the RIM devices A, B and C, is between the network address of the nodes which precede and follow those devices in the normal rotational sequence. Thus, numbers representing the addresses for RIM devices A, B and C are not illustrated in FIG. 6, but the three special purpose addresses occupy three addresses on the LAN.

The addresses of devices A and B are located to divide the even rotational sequence of the active nodes into a first group 100 and a second group consisting of the portions 102 and 104. The first group 100 of nodes includes at least one node which is more probable of having a high number of message communications to initiate, or a node which has a high transmission priority. Typically file processors will be included within the first group 100 of nodes. The first group 100 are "priority" nodes. At least one node is included in the first group 100. The second group consists of portions 102 and 104 and includes those nodes which are less likely to have messages to initiate. The second group are "non-priority" nodes. For example, work stations will usually be non-priority nodes of the second group. The second group of nodes also includes at least one node.

With reference to the even rotational sequence (clockwise as illustrated in FIG. 6) the first group 100 of nodes starts with a node at a first address (e.g. number 223) and concludes with a node at a last address (e.g. node number 47). The nodes of the second group commence with a node at a beginning address (e.g. node number 57) and terminate with a node at an ending address (e.g. node number 219).

As is illustrated in FIG. 6, the RIM device B has the capability of selectively passing the token directly to RIM device C, or to the node at the first address of the second group (e.g. node number 57). Passing the token to the beginning address of the second group allows the token to start the normal rotational sequence through the portion 102 of the second group of nodes. Similarly, the RIM device C has the capability of selectively passing the token directly to RIM device A or to the next following node (e.g. number 139) at the start of the portion 104 of the second group of nodes in the normal rotational sequence.

An algorithm for redirecting the token will cause RIM devices B and C to usually pass the token through only one of the portions 102 or 104 the second group of nodes with each circulation of the token through the network, usually on an alternating basis between the groups 102 and 104. The other portion 102 or 104 through which the token does not pass is eliminated from that single token passing circulation. However, in all cases, the token passes through the first group of priority nodes 100, because those nodes actually or probably have more or higher priority messages to communicate.

The token will usually pass through one of the portions 102 or 104 of the second group of non-priority nodes. In some cases, however, it might be possible to avoid passing the token through any of the second group of nodes by directly redirecting it from device B to device C to device A, or from device B to device A (not shown). On a periodic basis, the token should be passed through all of the nodes of the second group, to avoid incurring time-outs and other protocol restrictions which cause the system to reconfigure. Furthermore, another reason for passing the token through one or the other of the portions 102 or 104 with each circulation of the token is to accommodate the slower operating times of some processors which might be present in the high priority group. If a slow processor of a high priority node receives the redirected token before it could effectively use the token, a decrease in performance would occur despite the present invention. At the present time most of the newly manufactured processors and RIMs are capable of utilizing the token almost as quickly as it can be directed to it, as is illustrated by the second and third embodiments of the invention described below.

FIG. 7 illustrates means for implementing the token redirectional capability illustrated in FIG. 6. RIM device A is a conventional RIM as discussed above, but without a packet buffer and processor interface. RIM device A should be present to ensure that the target of the token redirection from RIM device C is always present and active in the LAN. RIM devices B and C are also conventional RIMs without packet buffers and processor interfaces. Redirectional logic 106 and 108 is associated with the RIM devices B and C, respectively. A redirection controller 110 defines and establishes the redirectional algorithm and controls the redirectional logic 106 and 108 associated with RIM devices B and C.

The redirection logic 106 and 108 either passes the token from the RIM devices B and C without altering the address information (DID, FIG. 4A) to allow the RIM devices B and C to pass the token in the normal rotational sequence, or when activated, the redirection logic modifies the destination address DID characters in the token when it passes from one of the RIM devices B or C onto the medium 42. When activated, the redirection logic 106 of RIM device B functions by detecting the ITT character of the token (FIG. 4A), and substituting the network address of RIM device C into the DID character fields of the token as it is transmitted onto the medium 42. Similarly, when activated, the redirection logic 108 detects the ITT character of the token and substitutes the address of RIM device A into the DID character fields of the token when RIM C device passes the token. When the redirection logic 106 or 108 is not activated the token is passed unmodified from RIM devices B and C, respectively, onto the medium.

The redirection controller 110 serves as control means for activating the redirection logic 106 and 108 to selectively redirect the token in response to a predetermined algorithm, to one of the RIM devices C or A, or through the portions of the second group of non-priority nodes in the normal rotational sequence. As is illustrated in FIG. 7, the three RIM devices A, B and C, the redirectional logic 106 and 108 and the redirectional controller 110 can be incorporated into a single device 112 and attached to the medium 42. More details of the device 112 are shown in FIG. 8.

Many of the components shown in FIG. 8 are the same as those of a conventional RIM shown in FIG. 5. The device 112, shown in FIG. 8, includes three RIM controllers, 60A, 60B and 60C, which respectively are associated with the network addresses A, B and C. The network addresses for the controller 60A, 60B and 60C are established by setting the associated RIM identification switches 64A, 64B and 64C, respectively. Each controller 60A, 60B and 60C is connected to an associated transceiver 58A, 58B and 58C, respectively. Only one hybrid circuit 54 is utilized in the device 112, and that hybrid circuit 54 is connected to each of the transceivers 58A, 58B and 58C. Signals received from the medium 42 by the hybrid circuit 54 are directly delivered to all three transceivers. Outgoing transmissions from any one of the transceivers 58A, 58B and 58C are applied through an OR gate 114 to the hybrid circuit 54. The hybrid circuit 54 delivers these outgoing transmissions to the LAN medium 42.

The redirection logic 106 is positioned in the signal path of outgoing transmissions from the controller 60B, between the controller 60B and the associated transceiver 58B. The redirection logic 106 includes a conventional two-to-one multiplexer 116 (MUX), a conventional eight-bit serializer 118, and an invitation to transmit (ITT) detector 120. The ITT detector 120 utilizes conventional logic elements to detect the presence of the ITT character in all outgoing transmissions supplied by the controller 60B. The function of the serializer 118 is to shift out in bit-serial fashion, the destination address value of special address C. The signal representative of special address C is supplied at 121 from the RIM ID switch 64C to the serializer 118. The function of the two-to-one multiplexer 116 is to substitute the bit serial destination identification supplied by the serializer 118 in the DID character field for the NID in a normal token, when the serializer 118 and multiplexer 116 are activated by a control signal at 122 from the redirection controller 110. A signal from the detector 120 is supplied at 124 to the redirection controller 110 when the ITT character of the token is detected.

The redirection logic 108 includes similar elements functioning in the same manner as has been described in conjunction with the redirection logic 106. A two-to-one multiplexer 126, a serializer 128, and an ITT detector 130 are provided. These elements 126, 128 and 130 function in conjunction with outgoing token transmissions from the RIM controller 60C to the transceiver 58C in the same manner as the similar elements in redirection logic 106 function with respect to outgoing token transmissions from RIM controller 60B. The signal representative of the address A at 131 is converted into bit serial form and is selectively inserted by the multiplexer 126 into the outgoing token transmissions. A signal at 132 from the redirection controller 110 activates the multiplexer 126 and serializer 128. A signal at 134 from the ITT detector 130 is supplied to the redirection controller 110 when the ITT character of the token is detected.

As can be seen from FIG. 8, the redirection logic 106 is capable of substituting, when activated, the DID of special purpose RIM address C. Therefore, a token transmitted from RIM device B can either be directly redirected to RIM device C, or, if the multiplexer and serializer are not activated by the redirection controller, the token is transmitted directly through the multiplexer without modification to the NID address of the next active node in the normal rotational sequence. A similar situation occurs with respect to the redirection logic 108, except that the token is transmitted directly to address A or to the address of the next node in the normal rotational sequence.

During a total system reconfiguration it is preferable to disable all token redirectional capability, thereby allowing the RIM devices A, B and C (FIGS. 6 and 7) to directly and efficiently establish their NIDs as the next active nodes in the normal rotational sequence. To this end a reconfiguration burst detector 135 is connected to receive the signals supplied by one of the transceivers. The reconfiguration burst detector 135 is shown in FIG. 8 connected to receive the signals supplied by the transceiver 58C. The detector contains conventional logic elements which specifically detect the unique pattern of the reconfiguration burst previously described. Upon detection of the reconfiguration burst, a reconfiguration signal is delivered to the redirection controller 110. The reconfiguration signal causes the redirection controller to disable all redirection capability. The reconfiguration signal also plays a role in understanding some of the token redirection algorithms discussed below in conjunction with FIGS. 10 and 11.

The three address version of the invention shown in FIGS. 6 to 8 may not actually need a reconfiguration burst detector 135, because proper system reconfiguration will ultimately be established by a combination of total system reconfigurations and active node NID reconfigurations. The use of the detector 135 avoids the situation where one of the RIM devices B or C may initially and erroneously establish the address of node B+1 or C+1, respectively, as its NID, as a result of the redirectional capability being enabled during system reconfiguration. However, should that initially be the case, the RIM devices will later change the NID to the proper active node in the normal rotational sequence as a result of NID reconfiguration activities which occur when the RIM devices B and C attempt to pass the token to addresses B+1 or C+1 when neither address identifies an active non-priority node.

The redirection controller 110 is a state machine sequencer which has been programmed through a programmable read only memory to accomplish the functions illustrated by the state transitions shown in FIG. 9. The initial state is entered from a reset and is a conditional test to determine whether or not the transmitter of the RIM controller (60B, 60C, FIG. 8) is idle. This initial state is illustrated at 140. So long as the transmitter is not idle, activity remains in the state 140. As soon as the transmitter goes idle, a transition to a state 142 waiting for an alert burst occurs. The state 142 is maintained until an alert burst (AB, FIGS. 4A, 4B) is detected. Upon detection of the alert burst, there is a transition to state 144 wherein the character immediately following the alert burst is checked to determine if it is an invitation to transmit (ITT) character (FIG. 4A). If an ITT character is not detected, there is a transition back to state 140 to wait for the RIM controller transmitter to go idle, at which time the steps described in conjunction with states 140, 142 and 144 are repeated. If an ITT character is detected, there is a transition from state 144 to state 146. In state 146, it is determined whether the redirection logic 106 and 108 (FIG. 8) is enabled (activated) and calling for redirection of the token. If redirection is not enabled, there is a transition from state 146 back to state 140, at which point the process is repeated. If the redirection logic is enabled, there is a transition to state 148. Under these circumstances and at this time, the ITT character has been detected and the next thing which will occur is the insertion in the DID field (FIG. 4A) of the address to which the token is to be redirected. In state 148, the multiplexer in the outgoing path is switched so that it takes data from the serializer (118 or 128) rather than from the controller (60B or 60C, FIG. 8). The input to the serializer is the address to which the token is to be redirected. Since the token contains two DID fields (FIG. 4A), the identification or address of the node to which the token is being redirected is inserted a first time at state 150 and a second time at state 152. After this has been accomplished, the multiplexer is set back to conduct signals from the controller path so that future transmissions will be normal, as is illustrated in state 154. Thereafter, a transition to state 140 occurs, to wait again for the transmitter to go idle and the process to begin again.

The state diagram illustrated in FIG. 9 is applicable to each of the redirection logic components 106 and 108 illustrated in FIGS. 7 and 8. Each redirectional logic portion 106 and 108 can be enabled separately, and it is for this reason that there is a conditional test associated with state 146 to determine whether redirection is enabled.

The state diagram illustrated in FIG. 10 is one example out of a large number of possible algorithms that might be used to control token redirection. It is necessary to disable all token redirection during network reconfiguration in order to properly establish the NID values for the RIM devices B and C in the normal rotational sequence. Initial state 156 accomplishes this, and is entered immediately following power-on reset and upon the occurrence of network reconfiguration. Since network reconfiguration starts with the active RIM of the highest network address and commences to the lowest active RIM ID and then on to successively higher RIM IDs, once RIM device C begins attempting to establish its NID value a transition to state 157 occurs. By the time the token gets to RIM device B it is assured that a complete rotational sequence of the token has occurred in establishing system reconfiguration. State 158 is entered and one example of a redirection algorithm is commenced.

In the state 158, the redirection logic associated with RIM device B is enabled and the redirection logic associated with RIM device C is disabled. Under this circumstance, RIM device B directly redirects the token to RIM device C, and RIM device C sends the token on its normal rotational sequence beginning with the next node following the special address C in the second portion 104 of the non-priority nodes (FIG. 6). A transition from state 158 to 159 occurs after RIM device C sends the token in its normal rotational sequence. In state 159, the redirection logic at RIM device B is disabled and the redirection logic at RIM device C is enabled. The token is passed from RIM device B to the next node in the even rotational sequence in the first portion 102 of non-priority nodes (FIG. 6). When the token reaches RIM device C, RIM device C directly redirects the token to RIM device A. A transition from state 159 back to state 158 occurs as soon as RIM device C sends the token. The redirection algorithm of states 158 and 159 can be implemented by a single flip-flop which toggles back and forth between two different states, wherein the redirection logic of the RIM devices B and C is in respectively different conditions in each state and the states alternate between each other.

FIG. 11 illustrates a more complex algorithm for redirecting the token. Again, and for the same purposes discussed in conjunction with FIG. 10, state 160 is entered from power-on reset and network reconfiguration; state 162 is entered when RIM device C sends the token; and state 164 is entered when RIM device B sends the token. In state 164, the redirection logic at RIM devices B and C are both disabled, and the token is passed in the normal rotational sequence. A transition from state 164 occurs when RIM device C sends the token, and the state 166 is established. In state 166, the redirection logic of RIM device B is disabled while the redirection logic of RIM device C is enabled. The token will be redirected through the priority group 100 of nodes and the portion 102 of the non-priority group of nodes (FIG. 6). Upon RIM device C sending the token, state 168 is entered, in which the redirection logic of both RIM devices B and C is enabled. The token will be redirected only through the priority group 100 of nodes (FIG. 6). Thereafter, upon RIM device C again sending the token, the redirection logic at both RIM devices B and C is disabled, allowing the token to make a complete circulation of all the active nodes in the normal rotational sequence. State 172 is entered upon C sending the token wherein the redirectional logic at RIM device B is enabled while redirectional logic at RIM C is disabled. The token will be redirected through the portion 104 of the non-priority group of nodes and the priority group 100 of nodes (FIG. 6). Upon RIM device C again sending the token, the state 174 occurs which is a state in which there is no change from that state at 172. On the next token rotation when RIM device C again sends the token, the redirectional logic at both RIM devices B and C is again disabled as there is a return to state 164.

As can be seen from the redirection algorithm example shown in FIG. 11, complete circulations of the token in the normal rotational sequence can be mixed with partial passages of the token through one or the other of the two portions of non-priority nodes, and further, the token can completely avoid passing through any of the portions of the non-priority nodes as is illustrated by the state at 168. A wide variety of different types of algorithms can be provided, but in each case, the token passes through the priority group of nodes.

By a modification to the circuitry illustrated in FIG. 8, it is possible to directly redirect the token from RIM device B to RIM device A, thereby bypassing RIM device C (not shown in FIG. 6). With reference to FIG. 8, the direct redirectional token pass from RIM device B to RIM device A is accomplished by including another conventional two to one multiplexer (not shown) in the signal path 121. One of the inputs to this multiplexer is from the identification switches 64C, and the other input is from the identification switches 64A. The redirection controller 110 activates this multiplexer to selectively supply either the identification of RIM device C or the identification of RIM device A to the serializer 118. Thus, in normal operation, this multiplexer supplies the address of RIM device C to the serializer 118 in order to redirect the token from RIM device B to RIM device C, as has previously been discussed. However, to directly redirect the token from RIM device B to RIM device A, the redirection controller activates this multiplexer so that the address of RIM device A is supplied to the serializer 118. Thus, the token passed from redirectional logic 106 of the RIM device B has substituted therein the address of RIM device A in the DID fields of the token. In this manner, the selective direct redirection of the token from RIM device B is either directly to RIM device C or to RIM device A. Furthermore, RIM device B still retains its capability to pass the token on to the next active node of the group 102 (FIG. 6) in the normal even rotational sequence.

An illustration of the token passing capability available from a second embodiment of the present invention is illustrated in FIG. 12. This embodiment of the invention is referred to as a one "special purpose" address version. As is illustrated in FIG. 12, the nodes in the normal even rotational pattern are shown connected by solid arrows representing the normal token passing sequence. Certain nodes of the network, for example nodes X and Y, are nodes which fall within a first group of priority nodes because they have a relatively high number of message communications to initiate, e.g. file servers. A RIM device immediately follows each of these priority nodes, at addresses X+1 and Y+1, respectively. Each RIM device X+1 and Y+1 includes a redirectional capability for selectively redirecting the token back to the preceding priority node, X or Y, respectively, as is illustrated by the dashed arrows. The RIM devices X+1 and Y+1 and those nodes between X+1 and Y and between Y+1 and X have addresses which fall within a second group of non-priority nodes which are less likely to have messages to communicate. The RIM devices X+1 and Y+1 are not nodes because they do not include processors and because they never initiate or receive messages. These RIM devices X+1 and Y+1 do occupy network addresses.

The components 200 forming the second embodiment of the invention, exemplified by node X and RIM device X+1, are illustrated in FIG. 13. A RIM 202 is connected to the processor 204 of node X. The RIM 202 transmits and receives through a transceiver and hybrid circuit 206 to the medium 42. A RIM device 208 (without a packet buffer and processor interface) has a network address one greater than the address of RIM 202. Redirection logic 210 is connected to the RIM device 208. The redirection logic 210 is selectively activated by a control signal at 212 supplied from the processor 204 associated with node X and its RIM 202.

When the processor 204 has not activated the redirection logic 210 by the control signal at 212, the normal token pass sequence is from RIM 202, to RIM device 208, to the RIM of the next active node in the normal rotational sequence (node 223 shown in FIG. 12). When the redirection logic 210 is activated by the control signal at 212 from the processor 204, the redirection logic 210 detects the ITT character of the token (FIG. 4A) being sent by RIM device X+1 and substitutes the address of the RIM X into the DID fields of the token when it is passed from the RIM device 208 to the hybrid circuit and transceiver 206. Thus, the token is redirected back to the RIM 202. The redirection occurs until the control signal at 212 to the redirection logic 210 is negated. In this manner, the token can be redirected from the RIM device X+1 back to the node X a predetermined number of times, before the token is passed on in the normal rotational sequence.

Under typical conditions the token can be recirculated back to node X until all of the messages which the processor 204 has to initiate have been communicated, subject to normal operating time-out limitations of the LAN to avoid system reconfiguration. Control over the redirection logic is advantageously achieved by having software in the processor 204 maintain a queue of the outgoing messages which need to be communicated. The redirection logic 210 may then be activated by a signal which the processor 204 software generates based on the presence of messages waiting in the queue. This allows the processor to communicate a plurality of messages in rapid order when such messages are awaiting transmission, while not redirecting the token unnecessarily when no messages are pending.

Appropriate safeguards must be provided to periodically transmit the token on in the normal rotational sequence even if messages are waiting in the queue, so that the normal network activity is maintained. Such safeguards are established by monitoring the length of time which has elapsed in the token circulation and comparing that time to the maximum allowable time which can expire before network reconfiguration occurs. Token redirection can occur until the elapsed time reaches a certain predetermined threshold, before the token is passed on in the normal sequence. The threshold may be established empirically, having consideration for the other versions of the present invention which are operating on the network.

Software (or special purpose hardware) at each priority node is required to prevent occurrence of the situation where a priority node recirculates the token for such an extended time period that some node on the network times out and enters a network reconfiguration sequence, believing the token to have gotten lost. The preferred means of implementing this function is to have each priority node maintain an interval timer which records the period which has elapsed since it last passed the token in its normal rotational sequence. If the priority node next receives the token when this interval exceeds a pre-determined proportion of the network reconfiguration timeout value (for example, 85% or 90%) then the token may not be recirculated by this node on this rotation. Transient conditions immediately following network reconfiguration can be avoided by having priority nodes cease recirculating the token when they detect a network reconfiguration (from a RECON bit in the RIM controller's status register) and not re-enable recirculation until they have monitored at least 3-5 complete token passing loops in the normal rotational sequence with consistent time periods, indicating that any burst of traffic immediately following reconfiguration has stabilized.

As many of the embodiments 200 can be used in a LAN as is desirable. When each priority node X has associated with it only one redirection capability, there is no concern for the interference created by the potential for overlapping redirectional patterns that could avoid passing the token to certain nodes. The redirection capability is efficiently achieved with the second embodiment of this invention, because the redirectioned token is routed directly back to the high priority nodes which have message communications to initiate, without passing the token through a whole group of priority nodes, some of which may not have additional message communications to initiate, or through a portion of the non-priority nodes. One additional special purpose address is consumed for each version 200 of the second embodiment of the present invention. This could consume a substantial number of network addresses on LANs with many priority nodes, unless more than one priority node is located between the first priority node and the RIM device with redirectional capability, as is discussed below.

More details of the second embodiment 200 are illustrated in FIG. 14. Transmissions to and from the LAN medium 42 are accomplished by hybrid circuit 54. Two transceivers 58X and 58X+1 are provided, for transmitting signals from the nodes X and the RIM device X+1, respectively, through an OR gate 214 to the hybrid circuit 54. Received signals are supplied directly to both transceivers 58X and 58X+1. The hybrid circuit 54 and the two transceivers 58X and 58X+1 form the component 206 shown in FIG. 13.

A RIM controller 60X is associated with the node X, and another RIM controller 60X+1 is associated with the RIM device X+1. A single node identification switch 64X is provided to establish the address of node X. A conventional device 216 adds one to the address signal supplied by switch 64X, to supply an identification to the RIM controller 60X+1 which is one greater than the node identification as set by switch 60X for node X. The processor 204 controls the RIM controller 60X to initiate message communications. Messages are transferred back and forth between the processor 204 and the RIM controller 60X by use of the packet buffer RAM 205 (which includes the conventional RAM 72, driver 68, and transceiver 70, FIG. 5). A queue of messages waiting to be initiated is maintained in the processor 204, and an appropriate signal is supplied at 212 to enable the redirection logic 210.

The redirection logic 210 is basically the same redirection logic associated with the RIM devices B and C as shown in FIG. 8. A two-to-one multiplexer 218 either passes the token unaltered from the RIM controller 60X+1 to the next node address in the normal rotational sequence, or when activated, the multiplexer 218 supplies the address of node X from switch 64X in the DID fields of the outgoing token (FIG. 4A). A serializer 220 supplies the signals from the switch 64X for substitution in the DID fields of the token. An invitation to transmit (ITT) detector 222 detects outgoing tokens from the RIM controller 60X+1, and signals a redirection controller state machine 224 by a signal at 226 when the ITT field of the token is detected. The control state machine 224 activates the serializer 220 and multiplexer 218 in response to the detection of the ITT field of the token, and in response to the direction enable signal supplied at 212 from the processor 204.

The functions of the control state machine 224 are better illustrated by the state transition diagram shown in FIG. 15. Comparing the state transition diagram of FIG. 15 with that shown in FIG. 9, it can be seen that both state transition diagrams are essentially the same. The various states of FIG. 15 are illustrated by identification numerals which are 100 greater than those illustrated in FIG. 9. The description of the states set forth previously in conjunction with FIG. 9 are applicable to the states and the transitions illustrated in FIG. 15. Notice, however, that the redirection enable signal comes from the processor, acting on the queue of messages waiting to be initiated and the other time limiting factors which must be taken into consideration to avoid reconfiguration. The redirection enable signal is applied to state 246, whereas the redirection enable signal is supplied from the redirectional controller and occurs in state 146 in FIG. 9. Also, the identification or address of node X is substituted in the states 250 and 252 shown in FIG. 15, rather than the identification from the other RIM which is substituted in states 150 and 152 in FIG. 9.

Although not shown in FIGS. 12 through 15, the redirection logic 210 (FIG. 13) could be associated with a RIM device address which is more than one address beyond the address of RIM X. In such circumstances, the address X+1 would be replaced by some address X+N, where N is greater than one. (Device 216 shown in FIG. 14 would then add N to the address value of node X, in this situation.) Under such circumstances, the token would be normally passed from node X to the next node address in the normal rotational sequence until it reached RIM device X+N. The token could then be selectively redirected back to node X in the same manner as has been described in conjunction with the redirection from RIM device X+1.

The modified token passing sequences available from a third embodiment 300 of the present invention are illustrated in FIG. 16. This version 300 of the invention is referred to as a "zero" address version. The normal token passing sequence is illustrated by solid arrows and the modified token passing capability is illustrated by dashed arrows. In this particular embodiment, a priority node of the first group, such as is illustrated by node Z, Z' or Z'', includes the capability to selectively redirect the token back to itself, rather than to the next node in the normal rotational sequence. To direct the token back to itself, the node first transmits onto the medium a token containing its own address in the destination identification (DID) fields of the token, to cause the necessary network activity to prevent other RIMs from timing out and beginning network reconfiguration, but transmitting the token in this manner prevents other nodes from accepting the token. Then, after an appropriate time delay to permit signal settling on the LAN medium, the node initiates another message communication. In this manner, the multiple message communications can be initiated and concluded from a single node before the token is passed to the next node in the normal rotational sequence or to any other node.

In a manner similar to the second embodiment of the invention, the present third embodiment is preferably activated in response to a queue of waiting messages maintained in a processor associated with the priority node, and other network operating constraints such as the timeouts of other nodes, to prevent the priority node from monopolizing the token to the exclusion of other nodes, thus causing a system reconfiguration.

The embodiment 300 is illustrated in FIG. 17 with respect to node Z. A RIM 302 is connected to a processor 304 associated with the node Z. Redirection logic 306 is connected to the RIM 302. The redirection logic 306 is controlled and activated by a control enable signal at 308 from the processor 304. When the redirection logic 306 is not activated the token is passed in the normal manner, and the normal operation of the RIM 302 is unaffected. When the control signal at 308 activates the redirection logic 306, the ITT character of the token (FIG. 4A) is detected and the network address of the node Z is substituted in the destination address (DID) fields. The token is transmitted by the transceiver and hybrid circuit 310 onto the medium 42, but the token is not passed to any other node because the DID character fields identify the network address of RIM Z Transmitting the token onto the network causes the necessary network activity signifying normal network operation. After transmitting the token with the address of the RIM Z to the transceiver 310, the redirection logic waits the requisite amount of time for the network medium to quiesce or settle and for the RIM 302 to be able to receive the token again. The token is then sent back to the RIM 302 at 312 from the redirection logic 306 without further network activity. Once the RIM 302 receives the token again, it may initiate another message communication.

More details of the third embodiment 300 of the present invention are shown in FIG. 18. The RIM Z includes the conventional hybrid circuit 54, transceiver 58, and RIM controller 60 and node identification switches 64. The hybrid circuit 54 and transceiver 58 form the component 310 shown in FIG. 17. The embodiment 300 also includes a packet buffer 305, which includes the conventional RAM 72, driver 68 and transceiver 70 (FIG. 5). In the embodiment shown in FIG. 18, the conventional components function similarly as they do in a conventional RIM. The processor 304 is also conventional, but in this particular instance will be ordinarily programmed to maintain a queue of awaiting messages to be transmitted, and will also maintain a determination of maximum timeouts, etc., necessary to secure normal network activity An enable signal 308 is supplied by the processor 304 to the redirection logic 306 when it is desired to redirect the token back to the node Z prior to passing the token to another network node address, thereby obtaining the capability of initiating multiple transmissions from the priority node upon the receipt of the token before passing it to another node.

The redirection logic 306 includes a transmit two-to-one multiplexer (MUX) 321 which supplies signals to the transceiver 58. Also included is a receive two-to-one multiplexer 314 which receives signals from the transceiver 58 and supplies them to the RIM controller 60. When enabled, a conventional 39-bit shift register 316 receives input signals transmitted by the transmit multiplexer 321. The operation of the multiplexers 321 and 314 and the shift register 316 is controlled by control signals from a control state machine 318. The control state machine 318 is controlled, and the redirectional logic is thereby enabled, by the signal applied at 308 from the processor 304.

The redirection logic 306 also includes an invitation to transmit (ITT) detector 320, and a serializer 322. The detector 320 and serializer 322 function in a manner similar to that as has been described in conjunction with other embodiments of the present invention.

When the redirectional capability is not enabled, the transmit multiplexer 321 and the receive multiplexer 314 directly pass signals between the transceiver 58 and the RIM controller 60 in the manner of a conventional RIM. However, when the redirectional capability is enabled, the 39-bit shift register 316 is enabled, and the detector 320 detects the presence of an ITT character in an outgoing token transmitted by the RIM controller 60, and signals the control state machine 318 at 324. The control state machine 318 enables the serializer 322 and the transmit multiplexer 321. The serializer supplies the address from switch 64 to the multiplexer 321, and the multiplexer 321 substitutes the address Z into the two DID fields of the token as it is transmitted through the multiplexer 321 to the transceiver 58. Upon transmitting the modified token onto the LAN medium 42 with the DID fields identifying the node Z, the necessary network activity is achieved, but no other node accepts the token.

The token supplied to the transceiver 58 comprises a bit pattern which is exactly 39 bits long. The 39 bits of the token include the six bit alert burst, the three framing bits preceding the ITT field, the eight bit ITT field, the three framing bits preceding the first DID field, the first eight bit DID field, the three framing bits preceding the second DID field, and the second eight bit DID field. The 39 bit pattern of the token is shifted one bit at a time into the shift register 316 as it is supplied by the multiplexer 321 to the transceiver 58. With the token bit pattern loaded into the shift register 316, the RIM controller 60 is allowed sufficient time to become ready to receive transmissions. In actual practice on an ARCNET LAN, the controller requires about six microseconds to be ready to receive data.

After the settling time during which the LAN medium quiesces and after the RIM controller 60 becomes ready to receive the token, the control state machine 318 activates the receive multiplexer 314 and the shift register 316. The bit pattern of the token for node Z is shifted from the register 316 to the multiplexer 314 and to the RIM controller 60 over path 312. The RIM controller 60 recognizes the token and initiates a communication in the conventional manner. The control state machine 318 returns the multiplexers 321 and 314 to their conventional operating state for direct transmission of signals between the transceiver 58 and controller 60. During normal RIM operation, the control state machine 318 also disables the shift register 316.

The state transition diagram of FIG. 19 illustrates the operation of the third embodiment. State 330 is a conditional test to determine whether the transmitter of the RIM controller 60 of the RIM Z is idle. When the transmitter goes idle, the shift register 316 (FIG. 18) is enabled for data entry, as is represented at state 332. Thereafter when an alert burst is detected in the state 334, a determination is made at state 336 whether an ITT character is detected. If no ITT character is detected, there is a return to the state 330. If an ITT character is detected, state 338 is entered where a determination is made whether token redirection is enabled. The signal from the processor 304 (FIG. 18) to enable token redirection controls the state 338. If redirection is not enabled, there is a return to state 330. If redirection is enabled, state 340 is entered wherein the transmit multiplexer 321 is set to supply data received from the serializer 322 (FIG. 18). In states 342 and 344, the address of the node Z is inserted into the first DID field and the second DID field, respectively, of the token Upon insertion of the address of the node Z in the DID field, the 39 bits of the token have been transmitted and the shift register 316 (FIG. 18) is disabled at state 346. Immediately following this, state 348 is entered wherein the transmit multiplexer 321 is set to provide a normal communication path between the RIM controller 60 and the transceiver 58 (FIG. 18). The next state 350, accomplishes the time delay to allow the RIM controller 60 (FIG. 18) to become capable of receiving data. Thereafter in state 352 the receive multiplexer 314 is set to shift the 39-bit pattern from the shift register 316 to the RIM controller 60, and the actual shifting of the token pattern from the shift register 316 to the receiver of the RIM controller 60 (FIG. 18) is accomplished in state 354. Thereafter in state 356, the receive multiplexer 314 is set to provide normal communication between the transceiver 58 and the RIM controller 60 (FIG. 18). Thereafter there is a return to the initial conditional test state 330, and the sequence repeats.

The primary benefit of the third embodiment of the present invention is that it does not consume any extra addresses on the LAN. Thus all of the network addresses can be consumed by fully operational nodes. The third embodiment also secures the capability of transmitting multiple messages from a single node before passing the token on to any other node on the LAN. The advantages associated with the second embodiment are also obtained by the third embodiment of this invention.

The token redirection available from the three embodiments of the invention discussed above are based on actual or anticipated need or urgency for the token. Preferably the actual need for the token is determined by a queue of messages waiting to be communicated by a priority node, but could also be based on the number of previous transmissions initiated by the node as another further example. The anticipated need or urgency can be addressed by the various predetermined disclosed embodiments or other algorithm based redirectional patterns as another example.

Three different embodiments of the present invention and their improvements have been described above with a degree of particularity. It should be understood, however, that the previous descriptions have been made by way of preferred examples, and that the scope of the present invention is defined by the following claims.

What is claimed:

1. In a token-based local area network comprising a plurality of nodes connected together at a single logical point by a communication medium, each node assigned a single different one of a plurality of unique network addresses, and token passing control means associated with each node and operative for normally passing a token to each active node in a normal even rotational sequence of all active nodes of the LAN in complete repetitions, each repetition including all active nodes, the normal even rotational sequence involved passing the token from one active node to the next active node in the sequence of network addresses, the token containing address information by which to address a specific node, the token enabling the node having an address corresponding to the address information contained in the token to initiate a message communication with another node, each node passing the token to the next node in the rotational sequence after concluding a single message communication; an improvement for selectively altering the normal even rotational sequence of token passing to pass the token more frequently to a first group of a plurality of nodes which are anticipated have more message communications to initiate compared to a second group of a plurality of nodes which are anticipated to have less message communications to initiate, each node in the first group falling within a sequence of network addresses from a first address to a last address, each node in the second group falling within a sequence of network addresses from a beginning address to n ending address, the beginning and ending addresses immediately following and preceding the last and first addresses, respectively, in the normal even rotational sequence, the second group including a node at an intermediate network address which is intermediate the beginning and ending addresses in the rotational sequence, said improvement comprising:

redirection logic means connected to the medium and operative in a first manner when activated for responding to the address information contained in a token corresponding to the beginning network address and for passing the token to an intermediate network address to bypass the nodes at the network addresses between the beginning and the intermediate network addresses of the second group, and operative in a second manner when activated for responding to the address information contained in a token corresponding to an intermediate network address and for passing the token to the ending network address to bypass the nodes at the network addresses between the intermediate and ending network addresses of the second group, and operative when not activated for normally passing the token to the next network addresses following the beginning and intermediate addresses in the second group to pass the token through all of the nodes in the second group in accordance with the normal even rotational sequence; and redirection control means for selectively activating said redirection logic means in only one of the first or second manners or not activating said redirection means, after each passage of the token through the first group of nodes.

2. An invention as defined in claim 1 wherein the second group includes at least one other node at a network address between the beginning and intermediate addresses and at least one other node between the intermediate and ending addresses.

3. An invention as defined in claim 1 wherein:
the second group includes a plurality of nodes between the beginning address and the intermediate address and another plurality of nodes between the intermediate address and the ending address; and
said redirection control means operatively activates said redirection logic means to alternately pass the token through nodes from the beginning address to the intermediate address and then through the nodes from the intermediate address to the ending address.

4. An invention as defined in claim 1 wherein:
said redirection control means activates or does not activate said redirection logic means in response at least in part to a predetermined maximum time duration during which the token must be received by any node after that node has previously received the token.

5. An invention as defined in claim 4 wherein the node at which the predetermined maximum time duration is measured is a node of the second group.

6. An invention as defined in claim 1 wherein the intermediate network address is a predetermined fixed address.

7. An invention as defined in claim 1 wherein the redirection logic means and the redirection control means are connected to the medium separately from the other nodes of the network.

8. In a token-based local area network (LAN) comprising a plurality of nodes connected together at a single logical point by a communication medium, each node assigned a single different one of a plurality of unique network addresses, and token passing control means associated with each node and operative for normally passing a token to each active node in a normal even rotational sequence of all active nodes of the LAN in complete repetitions, each repetition including all active nodes, the normal even rotational sequence involves passing the token from one active node to the next active node in the sequence of network addresses, the token containing address information by which to address a specific node, the token enabling the node having an address corresponding to the address information contained in the token to initiate a message communication with another node, each node passing the token to the next node in the rotational sequence after concluding a single message communication; a method of selectively altering the normal even rotational sequence of token passing to increase the likelihood that a higher proportion of time will be devoted to initiating message communications and a lower proportion of time will be devoted to passing the token to nodes which do not have messages communications to initiate, compared to normally passing the token in a normal even rotational sequence among the nodes, said method comprising:

dividing the nodes of the network into a first group of a plurality of nodes and a second group of a plurality of nodes;

anticipating that the first group will have more message communications to initiate compared to the second group;

each node in the first group falling within a sequence of network addresses from a first address to a last address, each node in the second group falling within a sequence of network addresses from a beginning address to an ending address, the beginning and ending addresses immediately following and preceding the last and first addresses, respectively, in the normal even rotational sequence, the second group including a node at an intermediate network address which is intermediate the beginning and ending addresses in the rotational sequence;

selectively altering the normal rotational sequence of token passing in a first manner in response to the address information contained in a token corresponding to the beginning network address by passing the token directly from the beginning network address to an intermediate network address to bypass the nodes at the network addresses between the beginning and the intermediate network addresses of the second group;

selectively altering the normal rotational sequence of token passing in a second manner in response to the address information contained in a token corresponding to an intermediate network address by passing the token directly from the intermediate network address to the ending network address to bypass the nodes at the network addresses between the intermediate and ending network addresses of the second group;

normally passing the token to the next network addresses following the beginning and intermediate addresses in the second group to pass the token through all of the nodes in the second group in accordance with the normal even rotational sequence when the normal rotational sequence is not selectively altered in one of the first or second manners.

9. A method as defined in claim 8 further comprising:
selectively altering the normal rotational sequence in only one of the first or second manners or normally passing the token, after each passage of the token through the first group of nodes.

10. A method as defined in claim 8 further comprising:
including in the second group at least one other node at a network address between the beginning and intermediate addresses and at least one other node between the intermediate and ending addresses.

11. A method as defined in claim 8 further comprising:
including in the second group a plurality of nodes between the beginning address and the intermediate address and another plurality of nodes between the intermediate address and the ending address; and
selectively altering the normal rotational sequence to alternately pass the token through nodes from the beginning address to the intermediate address and then through the nodes from the intermediate address to the ending address.

12. A method as defined in claim 8 further comprising:
selectively altering the normal rotational sequence or normally passing the token in response to a predetermined maximum time duration during which the token must be received by any node after that node has previously received the token.

13. A method as defined in claim 12 further comprising:
measuring the predetermined maximum time duration at a node of the second group.

14. A method as defined in claim 8 further comprising:
fixing the intermediate network address at a predetermined address.

15. In a token-based local area network comprising a plurality of nodes connected together at a single logical point by a communication medium, each node assigned a single different one of a plurality of unique network addresses, and token passing control means associated with each node and operative for normally passing a token to each active node in a normal even rotational sequence of all active nodes of the LAN in complete repetitions, each repetition including all active nodes, the normal even rotational sequence involves passing the token from one active node to the next active node in the sequence of network addresses, the token containing address information by which to address a specific node, the token enabling the node having an address corresponding to the address information contained in the token to initiate a message communication with another node, each node passing the token to the next node in the rotational sequence after concluding a single message communication; an improvement for selectively altering the normal even rotational sequence of token passing to pass the token more frequently to a predetermined priority node which is anticipated have more message communications to initiate compared to a plurality of other nodes which are anticipated to have less message communications to initiate, said improvement comprising:

redirection logic means connected to the priority node and operative when activated and in response to the address information contained in a token corresponding to the network address of the priority node for directly passing the token back to the network address of the priority node immediately after a message communication initiated by the priority node has concluded and before the token is passed to a different node at any other network address in the normal even rotational sequence, and operative when not activated and in response to the address information contained in a token corresponding to the network address of the priority node for normally passing the token to the next network address in the normal even rotational sequence after a message communication initiated by the priority node has concluded.

16. An invention as defined in claim 15 further comprising:
redirection control means for selectively activating said redirection logic means in response to a queue of message communications waiting to be initiated by the priority node.

17. An invention as defined in claim 15 or 16 wherein:
said redirection control means activates said redirection logic means in response to a predetermined maximum time duration during which the token must be received by any node after that node has previously received the token.

18. An invention as defined in claim 17 wherein the predetermined maximum time duration is determined with respect to a node which is not a priority node.

19. An invention as defined in claim 15 wherein:
the token passing control means inserts the network address of the next active node in the normal rotational sequence of network addresses upon passing the token after concluding a single message communication; and
said redirection control means when activated operatively alters the network address inserted in the token by the token passing control means from the next network address in the normal rotational sequence to the network address of the priority node, to return the token to the priority node to allow at least one other message communication to be initiated from the priority node before said redirection control means deactivates said redirection logic means to allow the token to be passed in the normal rotational sequence.

20. In a token-based local area network comprising a plurality of nodes connected together at a single logical point by a communication medium, each node assigned a single different one of a plurality of unique network addresses, and token passing control means associated with each node and operative for normally passing a token to each active node in a normal even rotational sequence of all active nodes of the LAN in complete repetitions, each repetition including all active nodes, the normal even rotational sequence involves passing the token from one active node to the next active node in the sequence of network addresses, the token containing address information by which to address a specific node, the token enabling the node having an address corresponding to the address information contained in the token to initiate a message communication with another node, each node passing the token to the next node in the rotational sequence after concluding a single message communication; an method of initiating a plurality of message communications from at least one priority node after only one message communication is initiated and concluded by each active node in receipt of the token, said method comprising:
identifying at least one predetermined node which is anticipated to have a relatively large number of messages to initiate compared to other nodes of the network;
selectively altering the normal rotational sequence of token passing in response to the address information contained in a token corresponding to the priority node network address by passing the token containing address information corresponding to the network address of the priority node network address after the priority node has initiated and concluded one message communication, to directly return the token to the priority node without passing the token to another node in the normal rotational sequence and allow the priority node to initiate another message communication before another node initiates a message communication; and
normally passing the token to the next network address following the address of the priority node in the normal rotational sequence after a plurality of message communications have been initiated and concluded by the priority node.

21. A method as defined in claim 20 further comprising:
selectively altering the normal rotational sequence in response to a queue of message communications waiting to be initiated by the priority node.

22. A method as defined in claim 20 or 21 further comprising:
selectively altering the normal rotational sequence in response to a predetermined maximum time duration during which the token must be received by any node after that node has previously received the token.

23. A method as defined in claim 22 further comprising:
measuring the predetermined maximum time duration with respect to a node which is not a priority node.

24. A method as defined in claim 20 wherein:
the token passing control means inserts the network address f the next active node in the normal rotational sequence of network addresses upon passing the token after concluding a single message communication; and further comprising:
selectively altering the normal rotational sequence by altering the network address inserted in the token by the token passing control means from the next network address in the normal rotational sequence to the network address of the priority node, to return the token to the priority node to allow at least one other message communication to be initiated from the priority node before the token is passed in the normal rotational sequence.

* * * * *